US010447719B2

(12) United States Patent
Smelker et al.

(10) Patent No.: US 10,447,719 B2
(45) Date of Patent: *Oct. 15, 2019

(54) SECURITY BREACH REPORTING AND INCIDENT MANAGEMENT SYSTEM

(71) Applicant: Centrl, Inc., Mountain View, CA (US)

(72) Inventors: Gregory David Smelker, Mountain View, CA (US); Davide De Micco, Mountain View, CA (US); Nitesh Gupta, Mountain View, CA (US); Shailesh Arun Alawani, Mountain View, CA (US); Sanjeev Dheer, Mountain View, CA (US); Christopher Marino, Mountain View, CA (US)

(73) Assignee: Centrl, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/002,868

(22) Filed: Jun. 7, 2018

(65) Prior Publication Data
US 2019/0007437 A1  Jan. 3, 2019

Related U.S. Application Data

(63) Continuation-in-part of application No. 15/394,782, filed on Dec. 29, 2016, now Pat. No. 10,013,665.

(60) Provisional application No. 62/272,763, filed on Dec. 30, 2015.

(51) Int. Cl.
G06F 3/00    (2006.01)
G06F 9/44    (2018.01)
G06F 9/46    (2006.01)
G06F 13/00   (2006.01)
H04L 29/06   (2006.01)
H04L 29/08   (2006.01)
H04W 12/02   (2009.01)
H04W 4/21    (2018.01)
H04W 12/12   (2009.01)

(52) U.S. Cl.
CPC .......... H04L 63/1425 (2013.01); H04L 63/04 (2013.01); H04L 63/102 (2013.01); H04L 63/1408 (2013.01); H04L 63/1466 (2013.01); H04L 63/308 (2013.01); H04L 67/125 (2013.01); H04W 4/21 (2018.02); H04W 12/02 (2013.01); H04W 12/1201 (2019.01)

(58) Field of Classification Search
CPC .................................... H04L 63/1425
USPC ........................................... 719/328
See application file for complete search history.

(56) References Cited

U.S. PATENT DOCUMENTS

2003/0236832 A1  12/2003  McIntyre
2005/0010456 A1   1/2005  Chang
2013/0290690 A1  10/2013  Nucci Primary Examiner — Timothy A Mudrick
(74) Attorney, Agent, or Firm — Martensen IP

(57) ABSTRACT

A breach reporting and incident management (BRIM) system and method are disclosed. The system and method include a network hardware and software platform through which multiple user entities can more automatically conduct and manage their relationships and exchange data. User entities include but are not limited to corporate entities. Once connections are established the connection itself is automatically archived along with all communications history, and data exchange history. Data exchanged includes data regarding security breaches affecting services provided by one of the users.

21 Claims, 27 Drawing Sheets

| Screen Number | Screen Name |
|---|---|
| 1. Global - Bank Login 1.1.1 | 20. Global - Bank Login (login1.html) |
| 2. VM - Global Dash 2.1.1 | 21. Vendor - Global Dashboard (vn_global_dashboard.html) |
| 3. VM- Perf 3.1.1 | 22. Vendor - Performance Monitoring (vm_perf_monitoring.html) |
| 4. VM - Perf 3.1.2 | 23. Vendor - Performance Monitoring - CashEdge (vm_ce_sla_exceptions.html) |
| 5. VM - Perf 3.1.3 | 24. Vendor - SLA Detail (vm_system_availability.html) |
| 6. VM - Perf 3.1.3 | 25. Vendor - SLA Detail - Table (vm_system_availability_table.html) |
| 7. CM Quest Status - 24.1.1 | 26. Client - Active Questionnaires (cm_quest_status.html) |
| 8. CM Perf Time Series 23.1.1 | 27. Client - Performance Monitoring (cm_perf_time_series.html) |
| 9. CM Perf Time Series 23.1.2 | 28. Client - Performance Monitoring - Union Bank (cm_ub_sla_exceptions.html) |
| 10. CM Perf Detail 23.1.3 | 29. Client - SLA Detail (cm_system_availability.html) |
| 11. CM Perf Detail 23.1.3 | 30. Client - SLA Detail - Table (cm_system_availability_table.html) |
| 12. CM Edit SLA 23.2.3 | 31. Client - Edit SLA (cm_edit_sla.html) |
| 13. CM Configure Client 23.2.4 | 32. Client - Configure System Availability SLA (cm_configure_sla.html) |
| 14. CM WO ISO 28.1.1 | 33. Client - Workbench ISO (cm_workbench.html) |
| 15. VM Invitation 1.4.2 | 34. Vendor - Invite (vm_invite_vendor.html) |
| 16. VM Bulk Invite 1.4.4 | 35. Vendor - Bulk Invite (vm_invite_bulk.html) |
| 17. VM My Vendors 7.1.1 | 36. Vendor - My Vendors (vm_my_vendors.html) |
| 18. VM Client Dash 1.1.2 | 37. Vendor - Client Dashboard (vm_client_dashboard.html) |
| 19. Global - Registration - Cold Registration | 38. Global - registration - Cold Registration (Registration_cold.html) |

FIG. 14

39. Global - Registration - Inter Domain 1st Time
40. Global - Registration - Inter Domain
41. Global - Registration - Intra Domain
42. Forgot your password
43. Reset your password
44. Message View (x.messages.view)
45. Message Create (x.messages.create)
46. Message Reply (x.messages.reply)
47. Message Forward (x.messages.forward)
48. Message View Thread (x.message.view)
49. Invitation (x.invite.create)
50. Invitation View Received (.invite.view)
51. Invitation View Sent (x.invite.view)
52. VM Settings Personal Profile (v.settings.profile)
53. VM Settings Personal Profile Edit (v.settings.profile.edit)
54. VM Settings Personal Profile Request Access (v.setting.profile.requestaccess)

66. Global - Registration - Inter Domain 1st Time (registration_inter_domain_f.html)
67. Global - Registration - Inter Domain (registration_inter_domain.html)
68. Global - Registration - Intra Domain (registration_intra_domain.html)
69. Forgot your password (reset_password.html)
70. Reset your password (reset_password_confirmation.html)
71. Messages - View (vm_messages.html)
72. Message - Create (vm_message_create.html)
73. Message - Reply (vm_message_reply.html)
74. Message - Forward (vm_nmessage_forward.html)
75. Message - View Thread (vm_message_view.html)
76. Invitation - Create (vm_invite_vendor.html)
77. Invitation - View Received (vm_invitations.html)
78. Invitation View Sent (vm_invitations.html)
79. VM Settings Personal Profile (vm_personal_profile.html)
80. VM Settings Personal Profile - Change Password (assets/popups_vm_change_password.html)
81. VM Settings Personal Profile - Request Access (assets/popups_vm_request_access.html)

55. VM SLA Time Series Zero State (v.pm.sla.timeseries)
56. VM Request SLA v.pm.sla.request)
57. CM Add SLA (c.pm.sla.add)
58. CM SLA Added (c.pm.sla.add)
59. CM Upload SLA (c.pm.sla.upload)
60. CM Upload SLA 3 Options (cpm.sla.upload)
61. CM Review Upload SLA (c.pm.sla.upload.review)
62. CM Review Upload Add Attachment (c.pm.sla.upload. review)
63. CM Manage SLA (c.pm.sla.manage)
64. CM Manage SLA Details (c.pm.sla.manage.details)
65. CM SLA Activity (c.pm.sla.activity)

82. VM SLA Time Series Zero State (vm_perf_monitoring_zerostate.html)
83. VM Request SLA (vm_request_sla.html)
84. CM Add SLA (cm_add_sla.html)
85. CM SLA Added (cm_sla_added.html)
86. CM Upload SLA (cm_sla_upload.html)
87. CM Upload SLA 3 Options (cm_sla_upload.html)
88. CM Review Upload SLA (cm_sla_upload.review.html)
89. CM Review Upload - Add Attachment (assets/popups/cm_add_attachment.html)
90. CM Manage SLA (cm_manage_sla.html)
91. CM Manage SLA Details (cm_manage_sla_detail.html)
92. CM SLA Activity (cm_sla_activity.html)

FIG. 15B

93. CM Edit SLA (c.pm.sla.edit)
94. CM Task Workbench (c.task)
95. CM Add New SL (c.pm.sla.add)
96. CM Review Upload SLA File Added (c.pm.sla.upload.review)

97. CM Edit SLA (cm_edit_sla.html)
98. CM Task Workbench (cm_tasks_panel.html)
99. CM Add New SLA (cm_add_sla_new.html)
100. CM review Upload SLA File Added (cm_sla_upload_review.html)

FIG. 16 bmn
Business Monitoring Network

Global Dashboard

☰ CLIENT, INC.

Jeff
Vendor Manager

☰ Tasks

Sort by: Date ▼

Vendor 1
SLA Overdue

Vendor 2
Questionnaire Submitted

Vendor 3
Invitation Received

SLA Exceptions

| Vendor | Category | Product | Status |
|--------|----------|---------|--------|
| #1 | Funds Transfer | Transfer Now | ♦ |
| #2 | Online Banking | Digital Banking Platform | • Send Reminder |

FIG. 17

Active Questionnaires

≡ Tasks  ≡ Vendor 2

Sort by: Date ▶  Janette
Info Security Officer

Client 1
Questionnaires Overdue  ∧

Client 2
Invitation Received  ∧

Client 3
May SLA Pending Approval  ∧

[Import]

FIG. 18

SECURITY BREACH REPORTING AND INCIDENT MANAGEMENT SYSTEM

RELATED APPLICATIONS

This application is a continuation of U.S. patent application Ser. No. 15/394,782 filed Dec. 29, 2016. Application Ser. No. 15/394,782 claims priority from U.S. Provisional Patent Application No. 62/272,763, filed Dec. 30, 2015.

BACKGROUND

The last decade has seen the rise of consumer networks of all sorts: social networks like Facebook™, professional networks like LinkedIn™, financial networks like Lending Club™ and several others. A common element of these networks is that individuals can connect with other individuals and exchange information. These network platforms were revolutionary because they allowed for one-to-many and many-to-many communication in ways that had never been possible before.

Unlike the consumer world, the business world has not seen widespread use of one-to-many or many-to-many networks for information exchange. There have been old networks like purchasing networks but nothing of the type and scale that we have seen in the consumer world. There are several reasons for this, including the unsolved technical challenges of securely accessing confidential data of many organizations, securely maintaining network relationship information and historical interaction data, among others.

FIG. 1 is a diagram illustrating a typical current process by which vendors and clients interact. All communications are one-to-one meaning one person at an entity interacts with another person at another entity. Any information gathering or data exchange is conducted manually, which requires a lot of effort for the individuals on either side of the communication.

In this example of clients and vendors, clients face growing regulatory pressure regarding management of third and fourth party relationships. That is any individual one-to-one communication may require one of the communicants to take some compliance action manually. This invites errors and increases inefficiency. In addition, it is currently difficult to aggregate data across multiple vendors, multiple organizations, and multiple processes given that there are no data standards across items and vendors.

On the vendor side, the vendor deals with many client requests for data, often being requests for reporting or compliance-related data. Vendors currently must deal with this overhead without internal systems to assist with automatically foreseeing and managing these aspects of client management.

Businesses have multiple relationships with other businesses. The most common type of relationship is that of a vendor and a client. A company can have multiple vendors and multiple clients. In addition, a company can have other types of B2B relationships such as with distributors, franchisees, marketing partners or survey respondents. In each of these relationships, there are specific products or services involved—one party delivers a certain service or product to the other party. Most of these relationships are governed by legal contracts and are subject to specific performance requirements. These requirements require a lot of information to be exchanged between the two parties. Let us take the vendor-client relationship as an example. In such a relationship, the client has to monitor the performance of the vendor. This is essential to ensure that the client has a secure and reliable partner. Such oversight of the vendor relationship is especially important when confidential data is being shared. With the rising threat of cyber-attacks, often the most vulnerable point may not be the internal systems of a company but a system of one of the company's vendors. Additionally, there are regulatory reasons for such monitoring. For example in the financial services industry, there are stringent requirements by regulators to ensure that financial service firms are monitoring their data supply chain—or their $3^{rd}$ and $4^{th}$ parties as they are often called in the trade. In addition to the regulatory reasons, there may be reputational reasons as well for such monitoring, as in the case of the retail industry where a retailer or manufacturer wants to make sure that its overseas supplier is using good human resource practices in compliance with US laws for example.

In the context of these relationships, there is a lot of data and information that is exchanged routinely. For example, for monitoring performance, companies send reports to their clients. These performance requirements are referred to by many names such as Service Level Agreements (SLAs) or Key Performance Indicators (KPIs) or Key Relationships Indicators. In addition, the parties also agree to specific oversight requirements—whether these are done through questionnaires being sent by one party to the other or other types of assessments such as on-site audits or third party audits. Additionally, there are many other types of information exchanged between the parties—these can be incident reports, financials, announcements or remediation items.

A B2B relationship is operationalized typically through individual employees at each company that interact with their counterpart at the other company. For example, Joe at company A deals with Sarah at company B and will interact with her to request information, provide reports and send messages. An example is a vendor manager at a company who may be dealing with a client manager at the other company. The vendor manager receives monthly SLA reports, periodic documents, receives questionnaires, answers the questionnaires which are then evaluated by the client and the evaluation may result in additional requests or actions.

Another important feature of these B2B relationships is their chain of dependency. For example, Company A may be a client of Company B and monitors its performance for the specific product or service that they have purchased from B. However, since the goal of the monitoring is to be informed about the reliability of the vendor, it is well known that the status of the vendor is in turn dependent on the reliability of its vendors or vendors of vendors.

It would be desirable for businesses to be able to use a network system for Business-to-Business (B2B) information exchange and monitoring, and also for shared security breach reporting and incident management. Many companies have the contractual, if not regulatory, obligations to report any major incident (e.g., site down, possible breach, major error, etc.) as well as breaches (e.g., security breach, lost personally identifiable information (PII), lost confidential information, etc.). Currently process heavily relies on email and existing support systems such as Salesforce™ or Service Now™. It is very manual in nature as well as tedious to track all communication across the systems and via each individual relationship, to make sure all parties are aware of what is happening. In turn the receiving party may need to alert their business partners of what is going on as well and the whole process starts over alerting the $4^{th}$ party and so on. Today, there is no single place to access this information or share it with others.

BRIEF DESCRIPTION OF THE DRAWINGS

FIGS. 14-16 list and describe screens of a user interface through which MIEN network participants interact with each other using the platform.

FIG. 17 is a screen shot of screen number 2 of FIG. 14.

FIG. 18 is a screen shot of screen number 26 of FIG. 14.

DETAILED DESCRIPTION

Disclosed herein is a B2B monitoring and information exchange network (MIEN) system that addresses the inefficiency of current many-to-many communication between businesses by creating a shared platform that enables both parties to interact efficiently and securely. It allows for two parties to provide information securely to multiple parties and/or for the counter party to efficiently aggregate similar information from multiple parties to assess risk. As described further herein, the system comprises processors and data storage facilities that automate aspects of data exchange and message interaction between individuals in different corporate entities that have specifically defined relationships. This includes the execution of instructions by the MIEN system that causes processors and database facilities to execute functions or take on altered configurations automatically.

In embodiments, relationship-pair modules allow individual user connections to build company-level relationships. The system is designed around relationship pairs. For example, for a vendor-client relationship, the system implements a vendor module and a client module. These pairs can only speak to each other (although in other embodiments, one module may be able to speak to a defined set of other modules too). That means if a user within a company is using a client module and sends a message or an invitation to another individual at another company, the client module interacts with a vendor module at the other company to respond to that communication. The counterparty at the other company can only do so within the vendor management module.

Another aspect of the system disclosed herein is the capability to leverage the connectedness of relationship pairs to enable sharing of information regarding security breaches or incidents. In an embodiment as further described below, users can subscribe to a directory-based system for sending notification and receiving notifications from other subscribers.

Figure 1:
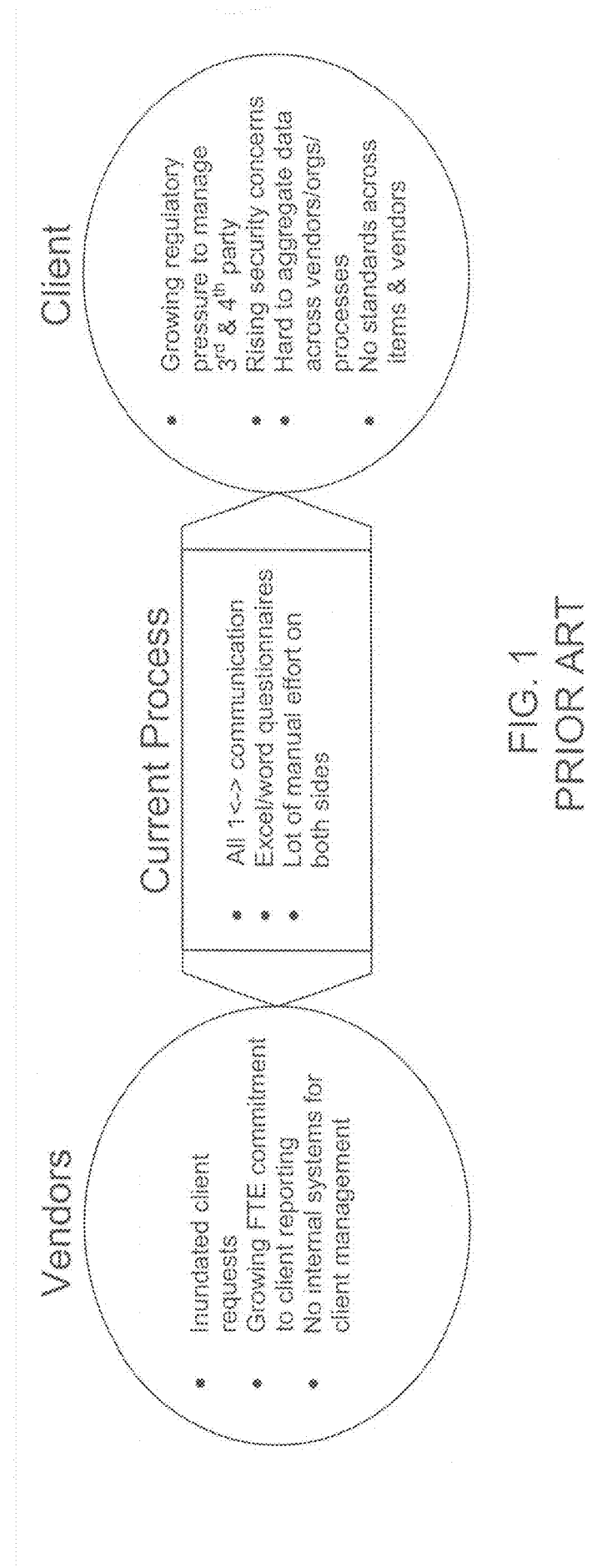
FIG. 1 is a diagram of a prior art vendor-client interaction.
Figure 2:
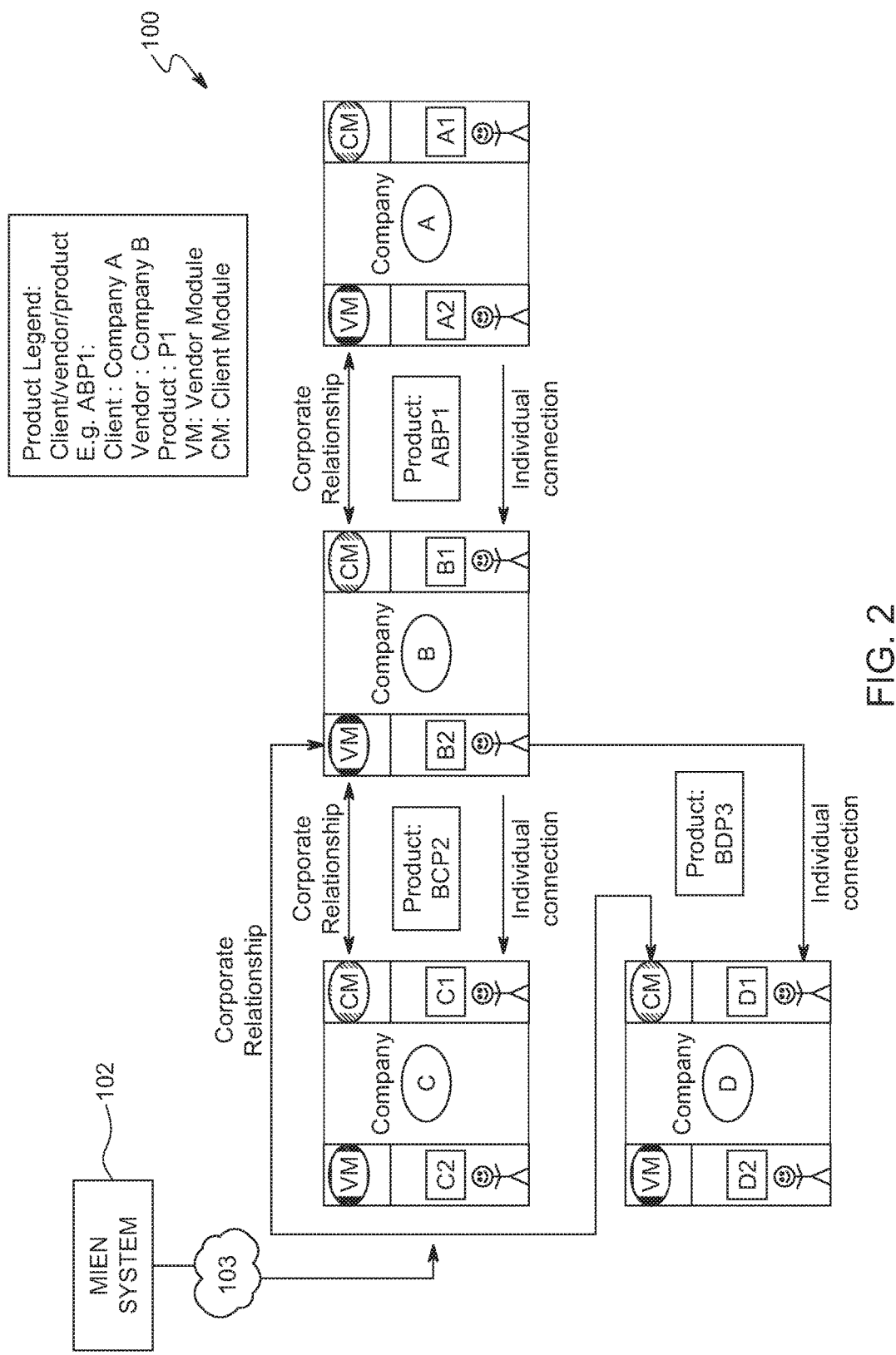
FIG. 2 is a diagram of a monitoring and information exchange network (MIEN) system according to an embodiment.

FIG. 2 is a block diagram of an overall system architecture 100 including a monitoring and information exchange network (MIEN) system 102 according to an embodiment. MIEN system 102 communicates with multiple entities (typically corporate entities) via the internet 103. As further described below, the MIEN system 102 provides a network hardware and software platform through which the multiple entities can more automatically conduct and manage their relationships and exchange data. In an example scenario, if A is using a product from B and wants to monitor B's performance, A also needs to be informed about the performance of C who is a vendor to B. And this chain can theoretically extend to several links. Often these chains are referred to as $3^{rd}$ party (for an immediate vendor) or $4^{th}$ party (for a vendor's vendor) and so on. This chain can also be seen in reverse: if a client is party 0, the client of the client is party 1 and so on. This "upstream" chain would be relevant for example in the context of a relationship with a distributor who sells a product to multiple customers. From an industry perspective, these upstream and downstream links can be seen as a continuous chain that is of interest to regulators to understand systemic risks and vulnerabilities in an industry.

For example, say a user A2 at Company A uses the Vendor Management (VM) module to interact with user B1 at company B1. The system automatically assumes that user B1 at Company B will be in the Client Management (CM) module. And that paired relationship is repeated down the chain to Company C and Company D. At each stage, each of the companies may be dealing with multiple companies in the counter-party role.

Figure 3:
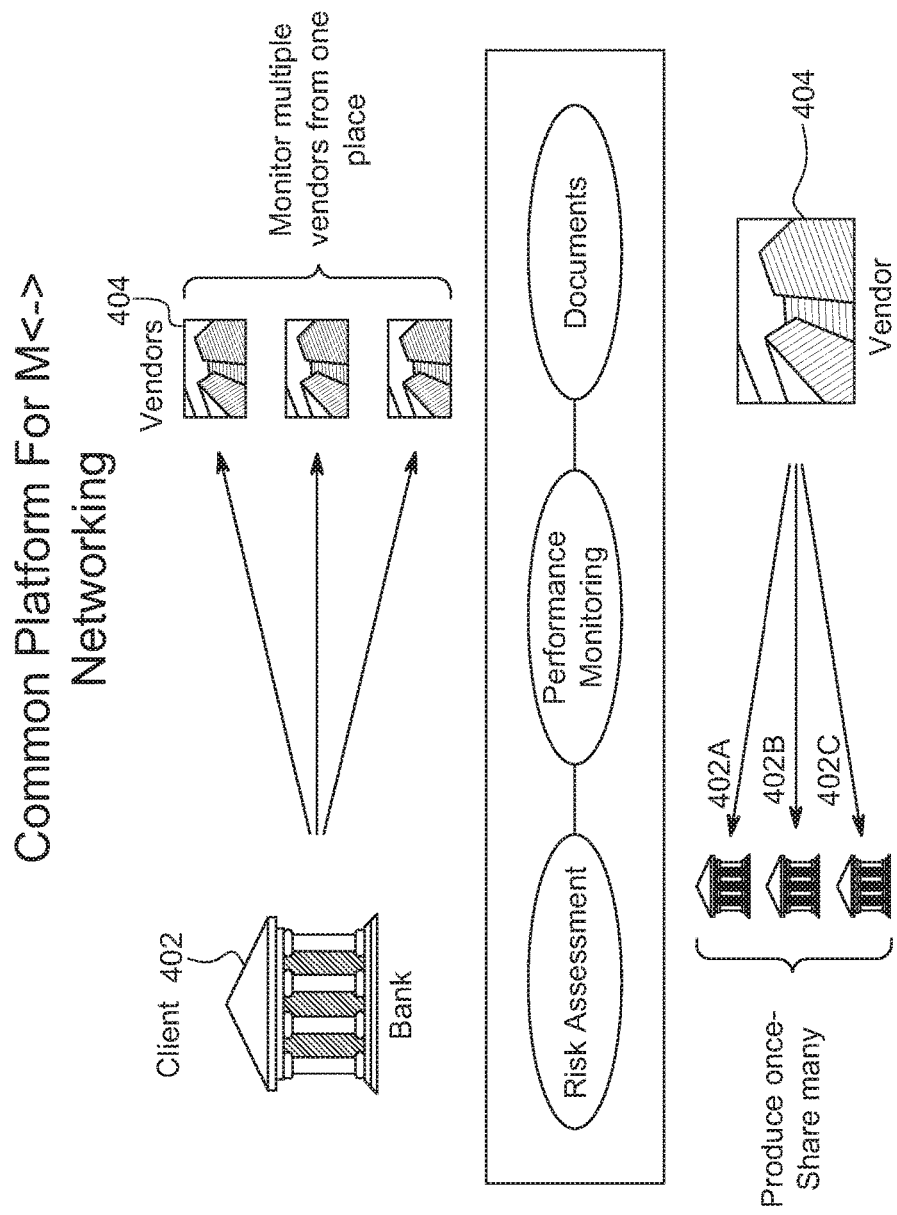
FIG. 3 is a diagram demonstrating that the MIEN system/network is a many-to-many network that allows multiple vendors and multiple clients to manage many tasks through one unified platform

FIG. 3 demonstrates that the MIEN system/network 102 is a many-to-many network that allows multiple vendors and multiple clients to manage many tasks through one unified platform. In the example used, a bank is shown as a client, but embodiments are not so limited. Any businesses managing multiple relationships with vendors/customers/clients benefit from using the platform. Client bank 402 uses the MIEN system/network 102 to communicate with and monitor multiple vendors 404 from one location. Monitoring includes risk assessment, performance monitoring, and document collection, storage, and exchange.

Documents produced by a vendor 404 can be produced once and shared with multiple clients of client locations 404 as appropriate, which obviates the necessity for individuals in each of client 404A, 404B and 404C to engage in an entire chain of communication with vendor 404 in order to obtain the documents.

Figure 4:
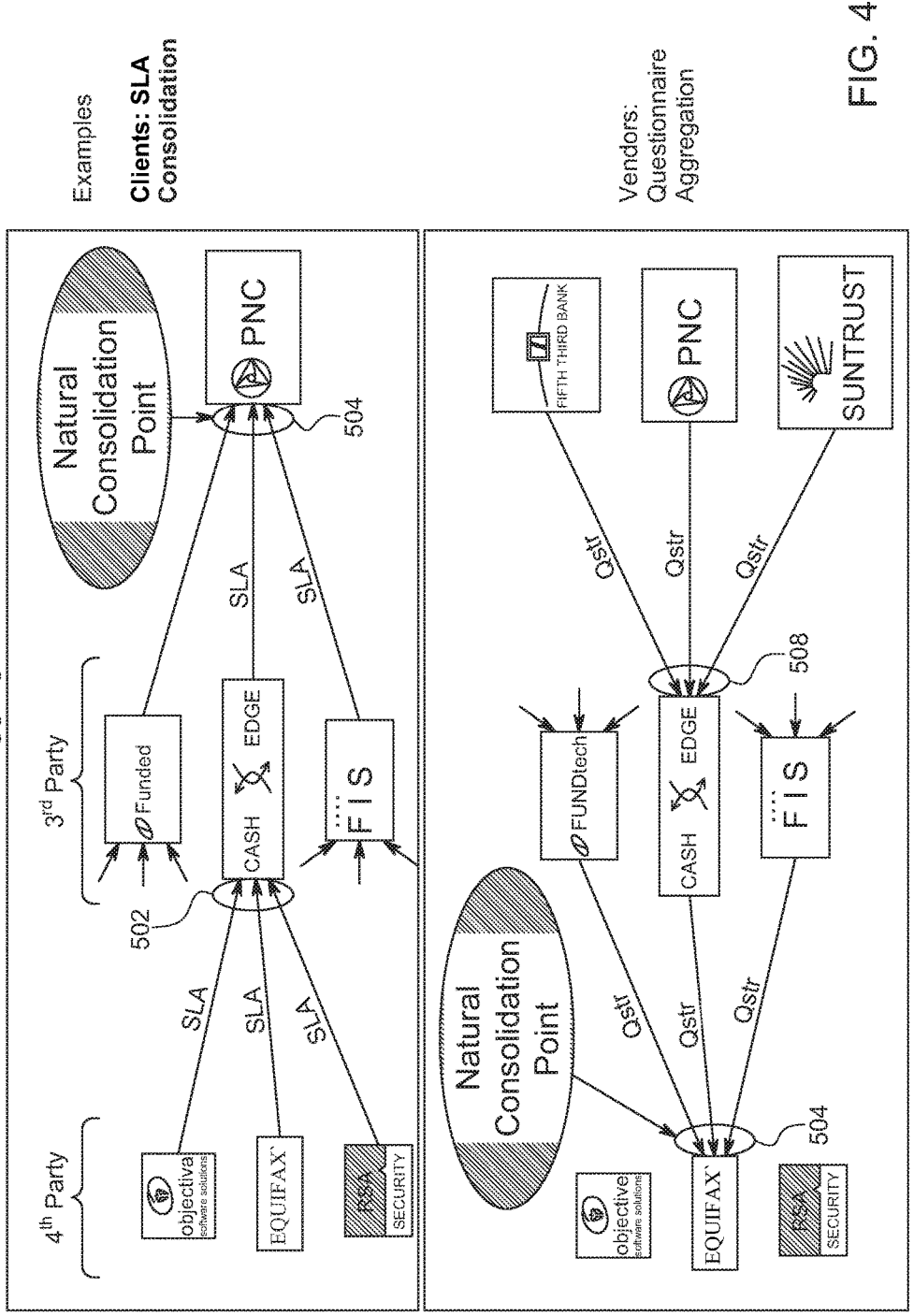
FIG. 4 is a diagram illustrating natural points of aggregation according to an embodiment.

FIG. 4 illustrates natural points of aggregation for one example situation, in this case service level agreement (SLA) consolidation and questionnaire consolidation. Again, this is just one specific example, and many other types of businesses and information requirements are included. In this example, SLAs and questionnaires are documents that must currently be requested and generated each time one is needed. As shown at 502, if multiple companies must submit service level agreement to one other company (in this case a third party company) and several third party companies must submit SLAs to a single company as shown at 504, point 504 is a point at which the process is consolidated by the MIEN system/network 102.

Similarly, if several companies must submit questionnaires to a the third party company from the previous illustration (at 508), and the third party company is one of several third party companies that submit questionnaires to one of the fourth party companies, a consolidation point is at the fourth party receiving company.

Figure 5:
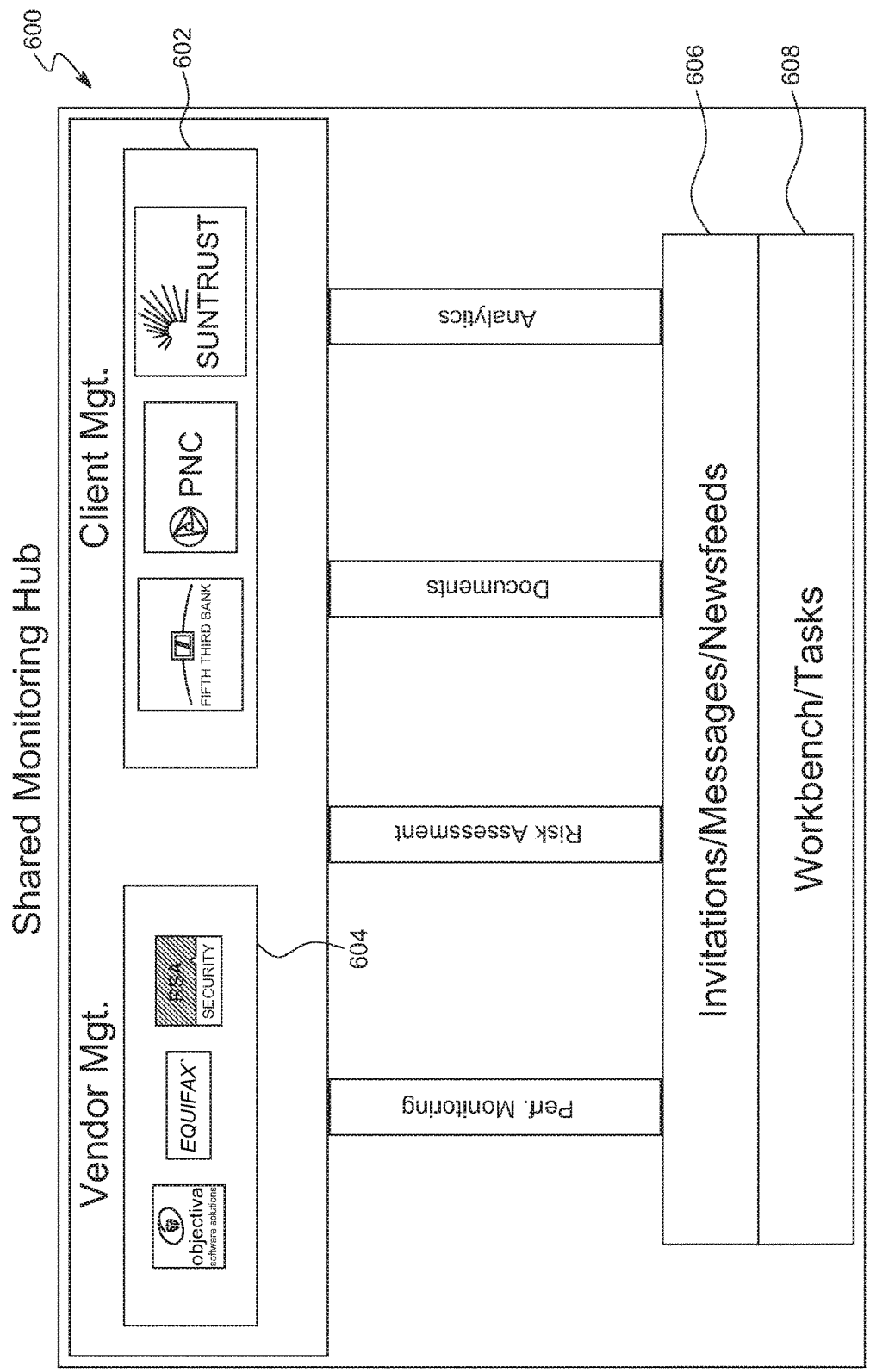
FIG. 5 alternatively illustrates the MIEN system/network platform as a shared monitoring hub.

FIG. 5 alternatively illustrates the MIEN system/network 102 platform as a shared monitoring hub 600 through which both vendors (through a vendor management module 604) and clients vendors (through a client management module 602) can automatically keep current with tasks such as performance monitoring, risk assessment, document archival/exchange, and analytics. A common platform for many-to-many communication is provided. Participants can manage upstream and downstream messages and data through the use of vendor management modules and client management modules. The scope of invitation/messages/newsfeed and data management is comprehensive (including for example, performance monitoring, risk assessment, document archival/exchange, analytics, and $4^{th}$ party monitoring). Flexible reporting is enabled (e.g., by organization, vendor and/or product). A task workbench 608 facilitates workflow on both vendor and client sides. Invitations (to the MIEN network/platform), messages, and newsfeeds 606 are also enabled. In various embodiments, the MIEN network uses data to pre-seed a vendor/product directory that is particularly meaningful to participants.

Figure 6:
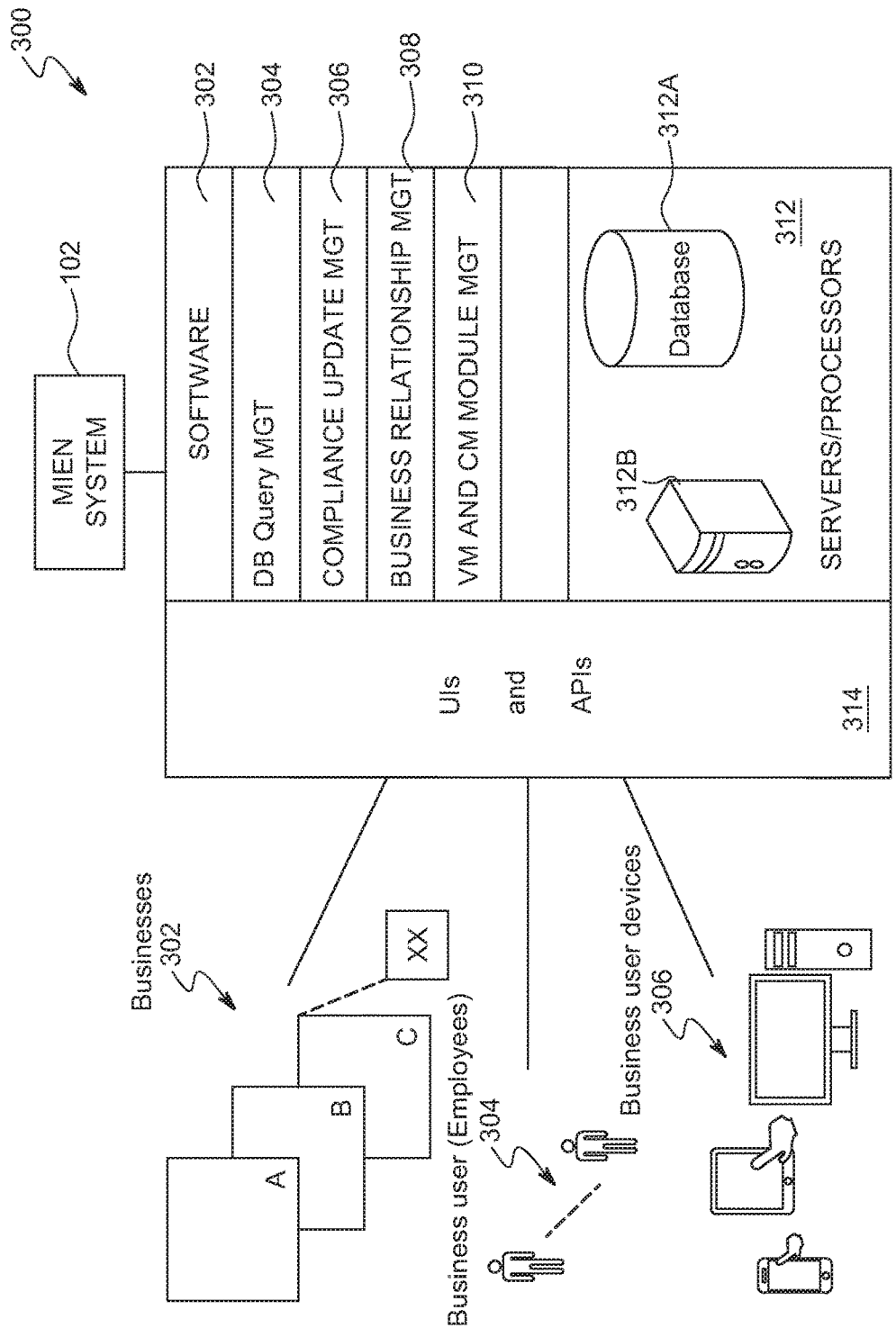
FIG. 6 is a diagram of a monitoring and information exchange network (MIEN) system according to an embodiment.

FIG. 6 is a block diagram of another view of an overall system architecture 300 according to an embodiment. The interaction of businesses with the MIEN system 102 is through business users (typically employees) logging onto a MIEN web site. Business users can access the MIEN system using any Internet capable user devices 306, such as personal computers, laptops, tablet computers, and smart phones. The MIEN system includes user interfaces and application programming interfaces 314 through which business users and possibly third parties can access the capabilities of the MIEN system and, in some embodiments, query the MIEN system databases.

The MIEN system runs multiple servers (which encompass processors 312B) and maintains multiple databases 312A. Although the servers and databases are shown in a discrete location, they may be in fact distributed geographically in any manner. In addition, processing tasks may be shared among many processors whether or not they are collocated. MIEN software processes are executed by the processors and perform a MIEN method as further described below. Non-exclusive examples of software processes include:

vendor management (VM) module and client management (CM) module management 310;

business relationship management 308, which serves to maintain a record of relationships between businesses;

compliance update management 306 which serves to update any rules and laws that must be complied with by businesses;

database query management 304 which serves to facilitate sophisticated searches of the MIEN databases 312A; and Servers/processors 312 respectively execute the processes described herein and store data securely for multiple businesses 302.

In various embodiments, MIEN databases 312A include a questionnaire database to assist business users in creating questionnaires that are routinely sent to counterparts. Business user can create questionnaires to submit through the MIEN system. However, the questionnaire database is more efficient in that is it tailored to a particular business. In addition to the questions in the database being categorized by business type, they are also grouped by frequency of use. For example, a particular question is known to be asked 100% of the time of vendor of financial institutions. Or another question is asked 10% of the time for vendors who deliver food to homes.

Another dedicated MIEN database 312A is a Service Level Agreement database.

Yet another dedicated MIEN database 312A is a business directory database that is populated by a company to include all information items of interest to current or potential business relationships. These items include product lists, service lists, and so on. This database can be automatically populated continually with the latest information, and is more current than the company web site, which is updated at longer intervals.

Once businesses 302 begin conducting all of their 1-1 relationships using the MIEN system 102, business users 304 no longer need to email their counterparts, exchange data files using email or Dropbox™-like sites, or spend time on the phone or other business user devices 306 for these purposes.

As a result of this paired communication, MIEN system 102 is able to automatically deduce company relationships based on the connection between two individuals (business users 304). So (with reference to FIG. 2) when user A2 sends an invitation from within the VM module to user B1 at company B, and B1 accepts the invitation, the system is able to deduce Company B has a vendor relationship with Company A and that A2 is a client and B2 is a vendor. This automatic categorization of the company relationship provides an efficient way to create a scalable network system for B2B relationships. This becomes even more apparent when one takes into account that company A and B might have multiple relationships that all operate at the same time. It is conceivable that B is a client of Company A for one product while being a vendor to Company A for a different product. And in fact it could be the same pair of users interacting with each other but in reversed roles. The system is able to keep these company relationships and user connections separately organized by tagging each message or data set that is exchanged between the two entities and the two users by virtue of the relationship pairing of the modules.

The linked chain of bilateral relationships can also be used to construct the multi-link chain at the product and company level. In the design of the system, the linked product chain or dependency chain can be created by using the paired-module approach. For each bilateral relationship, there is a product involved. For example, between Companies A and B, there is a product involved called ABP1 (meaning A is the client, B the vendor and the product is called P1). Company B has a vendor relationship with Company C and the product is P2 (Hence BCP2) or similarly BDP3 represents product P3 between client B and Vendor D. If a company in this chain were to link one product with another product in this bilateral relationship, the system is able to construct a multi-link chain of dependency for a given product. Such a chain could not previously be easily constructed because there is no physical way to link these relationships since the scope of each relationship is bilateral governed by legal contracts—hence the reporting obligations exist only bilaterally. In the disclosed system, if Company A were to link its product with B's product and B were to do the same with Company C or D, the system constructs a dependency or linkage chain where ABP1 depends on BCP2 and BDP2. Knowledge of this dependency chain can be very important to every player (especially multi-link chains) for all kinds of reasons such as information security. For example, if a Bank A were to use a vendor B and pass on some personal information about their customers (e.g. SSN or Driver's License) to vendor B to perform a service and then Vendor B were to pass that on to Vendor C and Vendor D to perform a service in support of their service to B, then that dependency chain is very important for Bank A to know and monitor. An incident or security breach at Company C or D may not be immediately within the purview of A (because they have no contract with C or D) but its impact on them could be significant. Such chains would also be very important for regulatory agencies that are interested in understanding the systemic risks and dependencies in an industry especially in light of the emerging information security risks.

Figure 7:
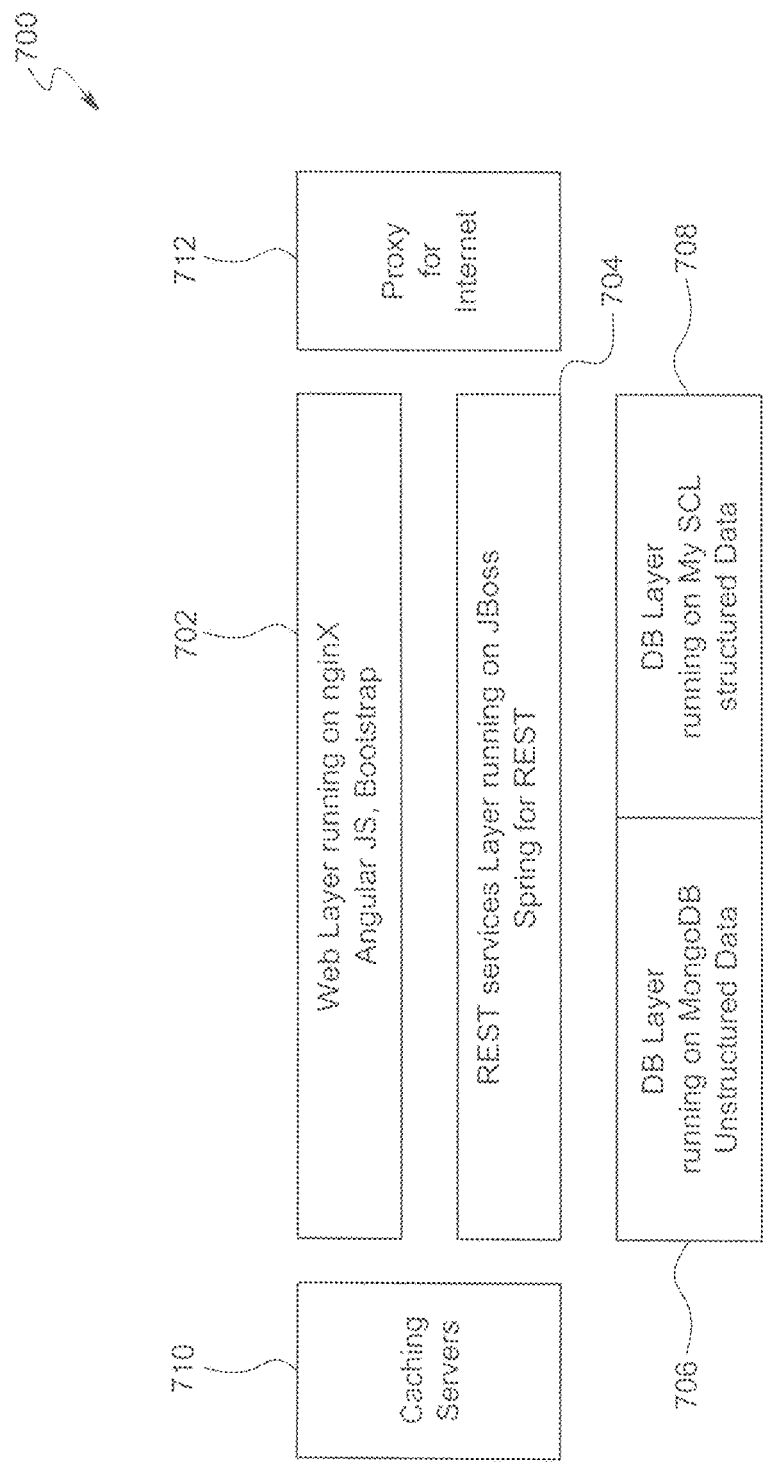
FIG. 7 is a block diagram of a MIEN system architecture according to an embodiment.

FIG. 7 is a block diagram of a MIEN system architecture 700 according to an embodiment. Between caching servers 710 and Internet proxy servers 712 sit layers of software processes. Caching server 710 may be physically located anywhere. Proxy servers 712 may also be located anywhere, and provide the communication interface between the internet and the MIEN system as well as preserving privacy of information. Database (DB) layers 706 and 708 are examples of types of databases that can be employed to store and make accessible user data and company data as further disclosed herein. In this example, DB layer 706 stores unstructured data and DB 708 stores structured data. The MIEN system is designed to accept and make available many types of data.

A web services layer 704 is a REST layer in one embodiment. A web layer 702 in one embodiment runs on nginX, but other configurations are within the scope of the invention.

Figure 8:
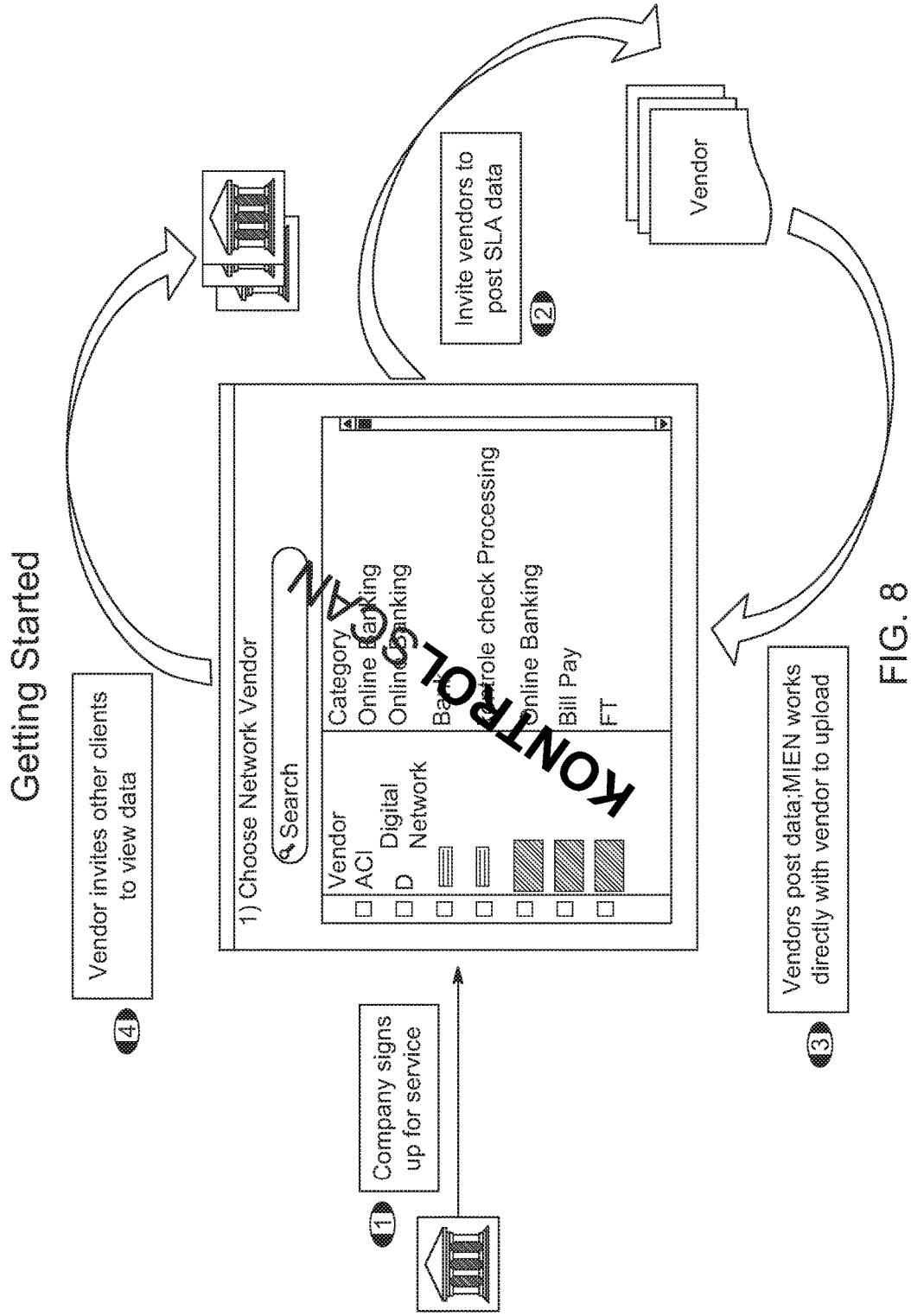
FIG. 8 is an illustration of one method of getting started using the MIEN system/network.

FIG. 8 is an illustration of one method of getting started using the MIEN system/network 102. At 1, a new user company uses the MIEN user interface to sign up for the service, which means signing up to use the MIEN system/network 102 to create and participate in an intercompany network. In an embodiment, the user interface displays a pre-populated list of companies from which the new user company can choose vendors. Through the MIEN system/network 102, chosen vendors are invited to post SLA data (and other data) using the MIEN system/network 102 (shown at 2). When a vendor posts data, the MIEN system/network 102 works directly with the vendor to upload the data to the MIEN system/network 102 (3). Once the data is uploaded, the vendor can invite other clients (other than the new user company) to view data using the MIEN system/network 102 (4).

Figure 9:
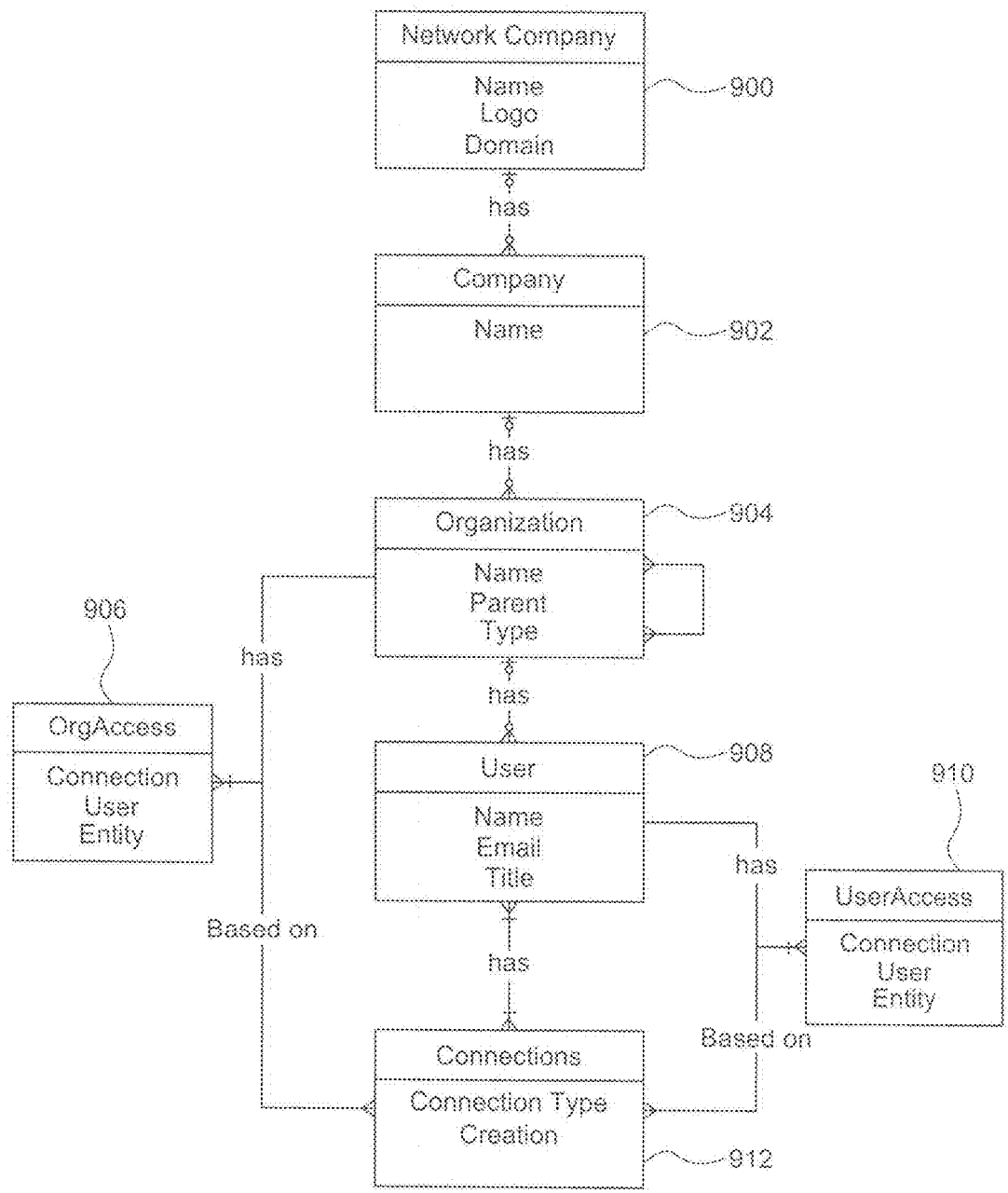
FIG. 9 is a block diagram illustrating relationships between a company's systems and various users according to an embodiment of a MIEN network.

FIG. 9 is a block diagram illustrating relationships between a company's systems and various users according to an embodiment of a MIEN network.

Network company 900 in this example is a company using the MIEN network system. Company 900 is defined at least in part, by a name, a logo and a domain. The network company in turn as a company 902 that may represent a company entity organized beneath the network company 900. The company 902 is recognized within the system by a name, and has an organization entity 904 defined at least in part by an organization name, a parent identification, and an organization type. Within the organization 904, there are multiple users 908, identified by a user name, a user email address and a user title. The organization user 908 has connections 912 identified by connection type and creation method. Organization access 906 represents the access that organization 904 gains to common MIEN communications and data based on connections 912. In turn, on the side of entities accessing the MIEN network of the organization 904, user access 910 represents external users who have a connection to the network based on connection (912) type and creation method.

Figure 10:
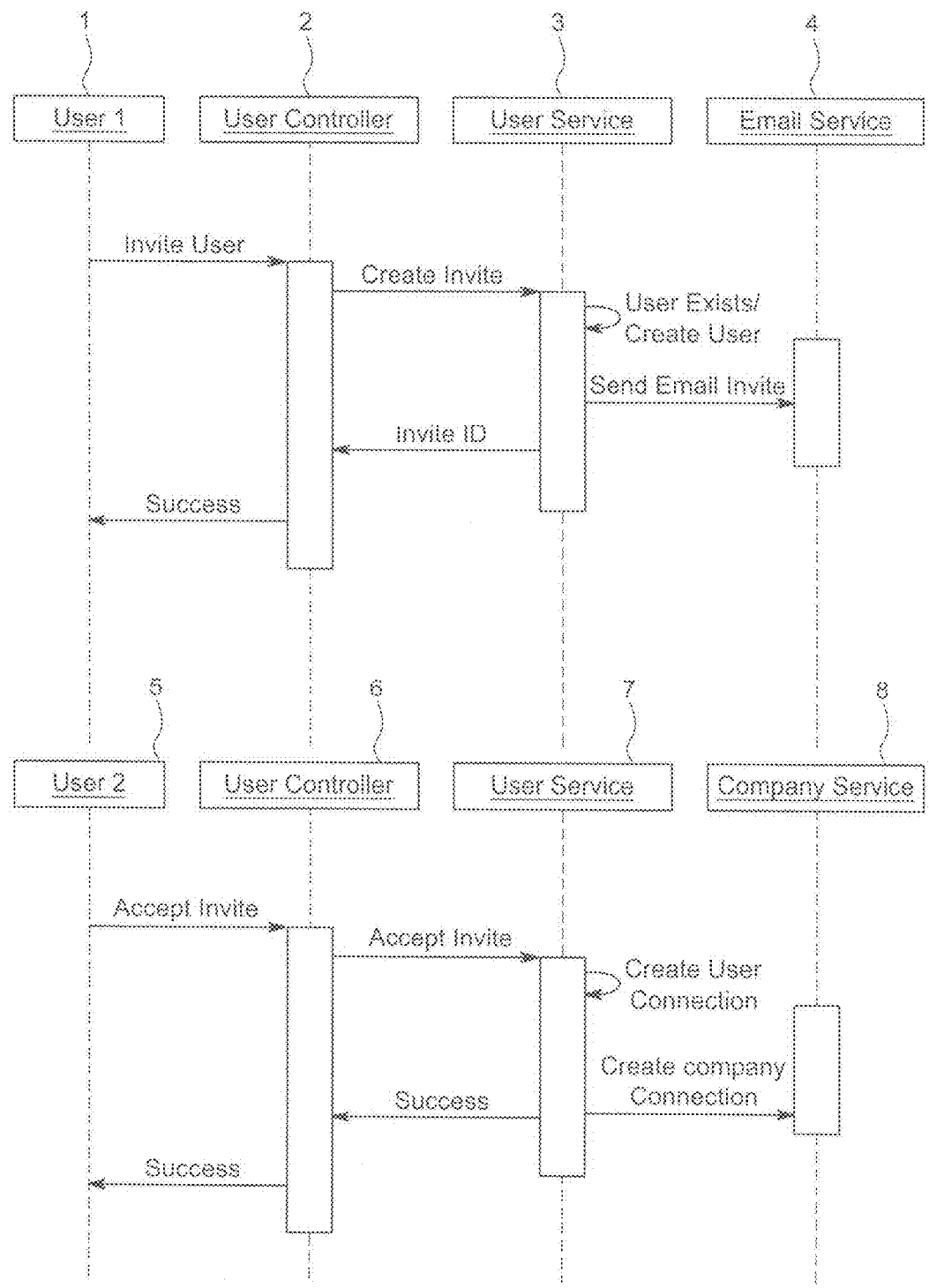
FIG. 10 is a flow diagram illustrating the creation of user connections by a MIEN system according to an embodiment.

FIG. 10 is a flow diagram illustrating the creation of user connections by a MIEN system according to an embodiment. Referring to the circled numbers that reference columns of the diagram, in column 1, a user 1 (who is currently part of a company or organization that uses the MIEN system) invites a user. This causes a user controller (2) to create an invitation that is handled by a user service (3) of the MIEN system. The user service determines whether the user exists, and is the user does not exist, and email invitation is sent to the user by email service (4). An invite ID is returned to the user controller. When the invitation is successful, the MIEN system is in communication with user 2 (5). When user 2 accepts the invite, the user controller (at 6) transmits the acceptance to the user service (at 7). The user service creates a user connection and sends a success message to the user controller (which conveys it to user 2). The user service also creates the company connection and sends details regarding the company connection to company service (8).

Figure 11:
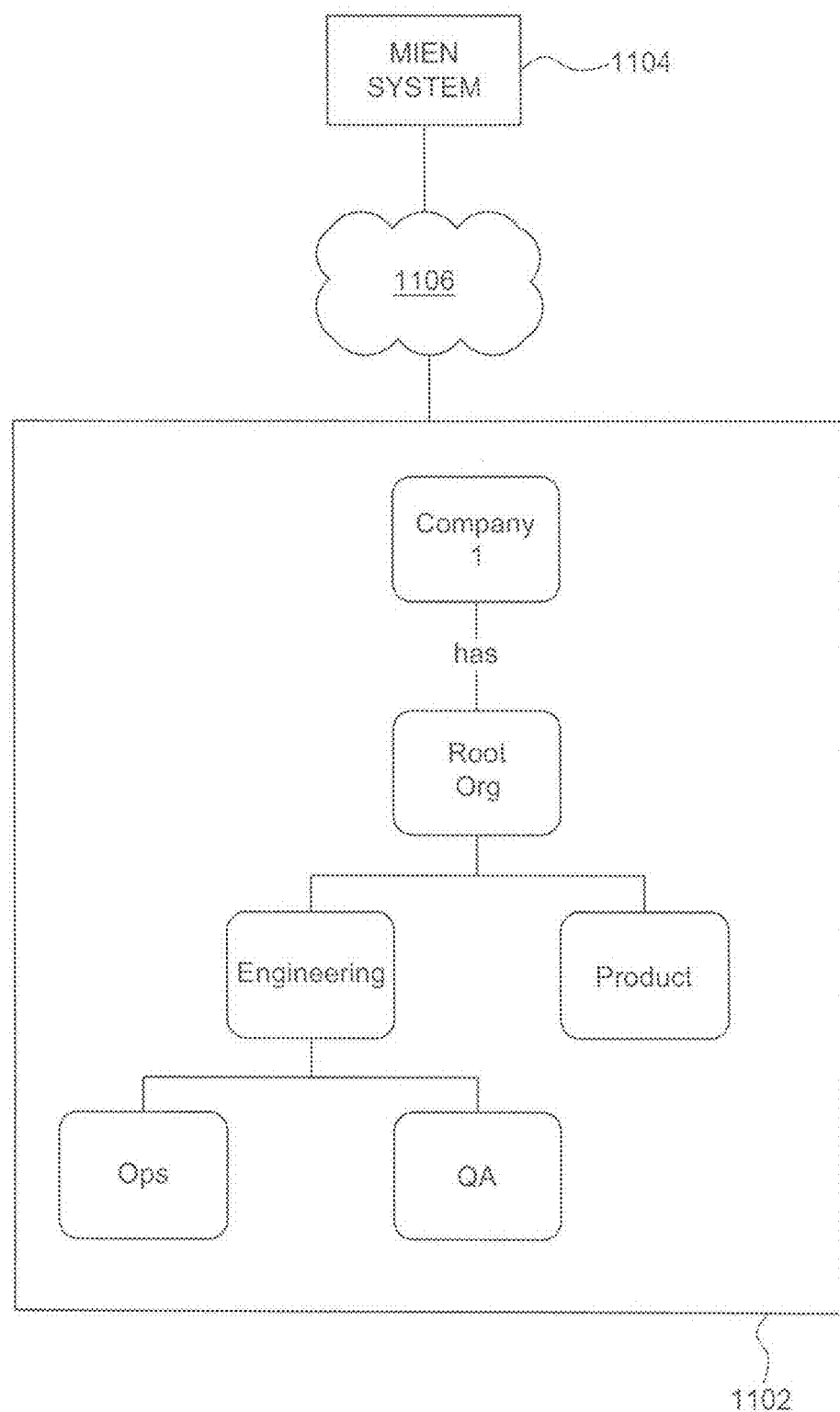
FIG. 11 is a block diagram of an example company system illustrating a MIEN systems access to the system according to an embodiment.

FIG. 11 is a block diagram of an example company system illustrating a MIEN systems access to the system according to an embodiment. Company "1" 1102 includes various groups defined by function or output or any other criteria. Each group includes its own processes and databases. In this example, company "1" includes a root organization group, an engineering group, a product group, an operations group, and a quality assurance group. MIEN system 1104 has access to all of these groups within company "1 in order to produce content for sending to external users or to receive content sent by external users.

Figure 12:
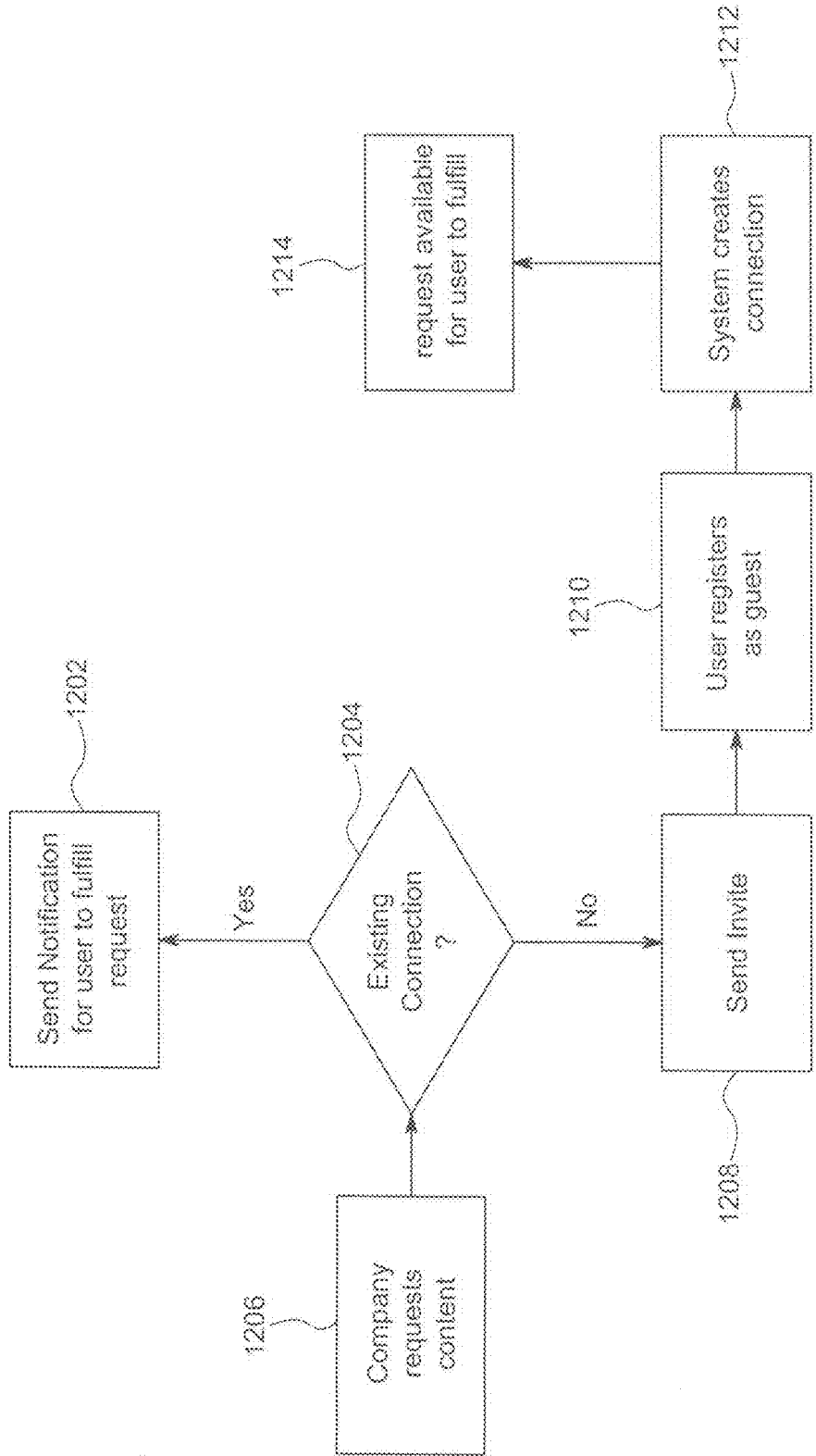
FIG. 12 is a flow diagram of a request-for-content process according to an embodiment.

FIG. 12 is a flow diagram of a request-for-content process according to an embodiment. Content may be any kind of data exchanged by companies that participate in the MIEN system. At 1206, a company requests content from another company or entity with which it has some kind of relationship. At 1204, it is determined whether there is an existing connection within the MIEN network. If there is an existing connection, at 1202 the MIEN system sends a notification for a user to fulfill the request.

If there is not an existing connection, the MIEN system automatically sends an invitation (1208) to the company/user from whom the content is requested. The user may register as a guest of the MIEN system (1210), causing the MIEN system to create a connection (1212). The request is then available to the guest user to review and fulfill (1214).

Figure 13:
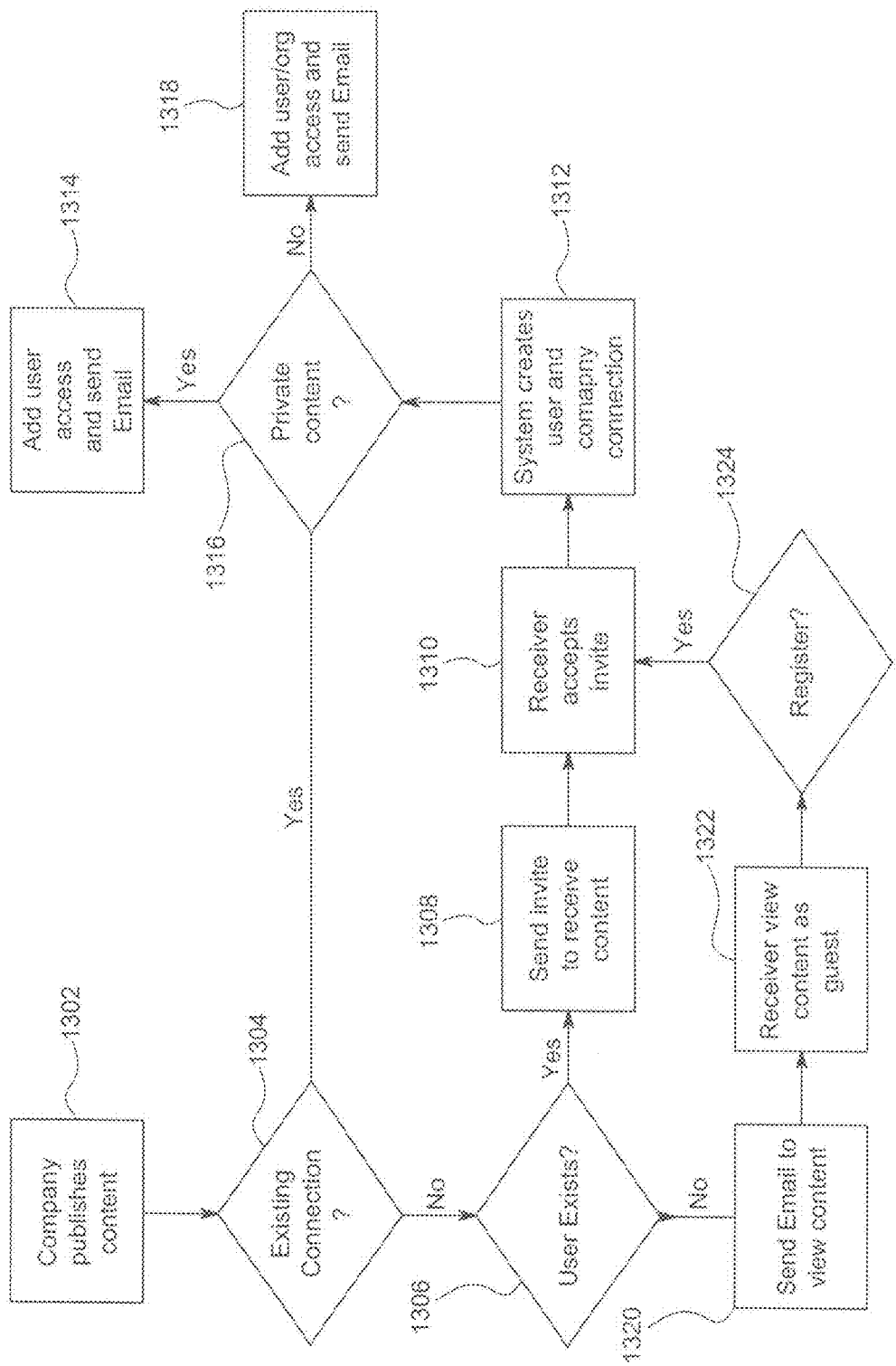
FIG. 13 is a flow diagram of a content publication process according to an embodiment.

FIG. 13 is a flow diagram of a content publication process according to an embodiment. At 1302 a company (which is part of the MIEN system) publishes content. Content can be any data of interest to other companies or entities with which the company has a relationship. At 1304 it is determined whether there is an existing connection between the publishing company and the intended recipient company. If there is an existing connection, it is determined whether the content is private (1316). If the content is private, the MIEN system automatically adds user access credentials and sends an email with these credentials to the intended user. As previously described, connections for data exchange within the MIEN system are most typically on a one-to-one basis, meaning the system knows the individual to whom the email should be addressed based on connection data already stored by the system.

If the content is not private, the user/org access is added to an email (1318) which can go to the recipient organization as a predefined group of individual recipients.

Referring again to 1304, if the connection does not exist, it is determined whether the user exists within the MIEN system (1306). If the user exists, an invitation is sent to the user to receive the content (1308). When the user accepts the invitation (1310), the system creates (1312) a user and company connection, and the process continues to 1316.

Referring again to 1306, if the user does not exist, the system generates and sends an email to the user with an invitation to view the content (1320). The receiver can then view the content as a guest of the MIEN system (1322). The receiver is invited to register with the MIEN system (1324). If the receiver accepts the invitation (1310), the user becomes an existing connection, and data in the form of notifications and contents is automatically addressed to the receiver. In addition, the receiver then is connected in the MIEN system with the sender of the content.

FIGS. 14-16 list and describe screens of the user interface through which MIEN network participants interact with each other using the platform. The user interface is executed by servers 312B and is accessed by business users 304. A shown in the descriptions, various screens are presented through a vendor module, while others are presented through a client module. In this single example, a particular group of relationships is accommodated, but any kind of industry relationships could also use the platform.

FIG. 17 is a screen shot of screen number 2 of FIG. 8. This is a global dashboard visible to Jeff, who is a vendor manager at the company "Client, Inc." Jeff can see pending tasks for multiple vendors, as well as more detailed information. In this case the more detailed information includes SLA exceptions, but embodiments are not so limited.

FIG. 18 is a screen shot of screen number 26 of FIG. 8. This is an "active questionnaires" page visible to Janette, who is an info security officer at Vendor 2. Jeff and Janette are connected individually through the MIEN network. Janette can also see pending tasks from her side, which include active questionnaires from multiple clients.

FIG. 19-FIG. 26 generally illustrate a breach reporting and incident management (BRIM) system. The BRIM system is built on top of the MIEN system. In an embodiment, the BRIM system is a directory-based system. Subscribers to the system can add their company information, or list their services for other subscribers, and subscribe to get information on other services as well. Subscribers have the ability to permission any other subscribers to their services and also un-subscribe from any services. The sender will be able to send notifications based on their services about any incident or breach that may have occurred, notifications may be in the form of a single message, multiple messages, or documents. The system will deliver the message and require the subscriber to acknowledge receipt, so that the sender can track who has seen what. The subscriber can then act as a sender and re-send that message to its subscribers if one of their services is impacted due to the notification, and so on.

Another aspect of the BRIM system is the highly confidential nature of the information it handles and the timeliness of the reporting. The facts surrounding the incidents are by themselves highly confidential and can have a material impact on the company that suffers the breach as well as its clients who are impacted by association. The details regarding information that is breached is equally sensitive in these matters, often involving the personally identifiable information (PII) data of customers, employees or other entities. Also, notifications must be timely. Increasingly, regulators demand that breaches be reported within tight time intervals, such as 72 hours in the case of the general data protection regulation (GDPR).

In an embodiment, the BRIM system is built on a distributed ledger system, meaning a type of database that is shared, replicated, and synchronized among the members of a network. Participants in the network govern and agree by consensus on the updates to the records in the ledger. This helps de-centralize the data, ensures the parties' non-repudiation, and keeps all the data immutable.

Figure 19:
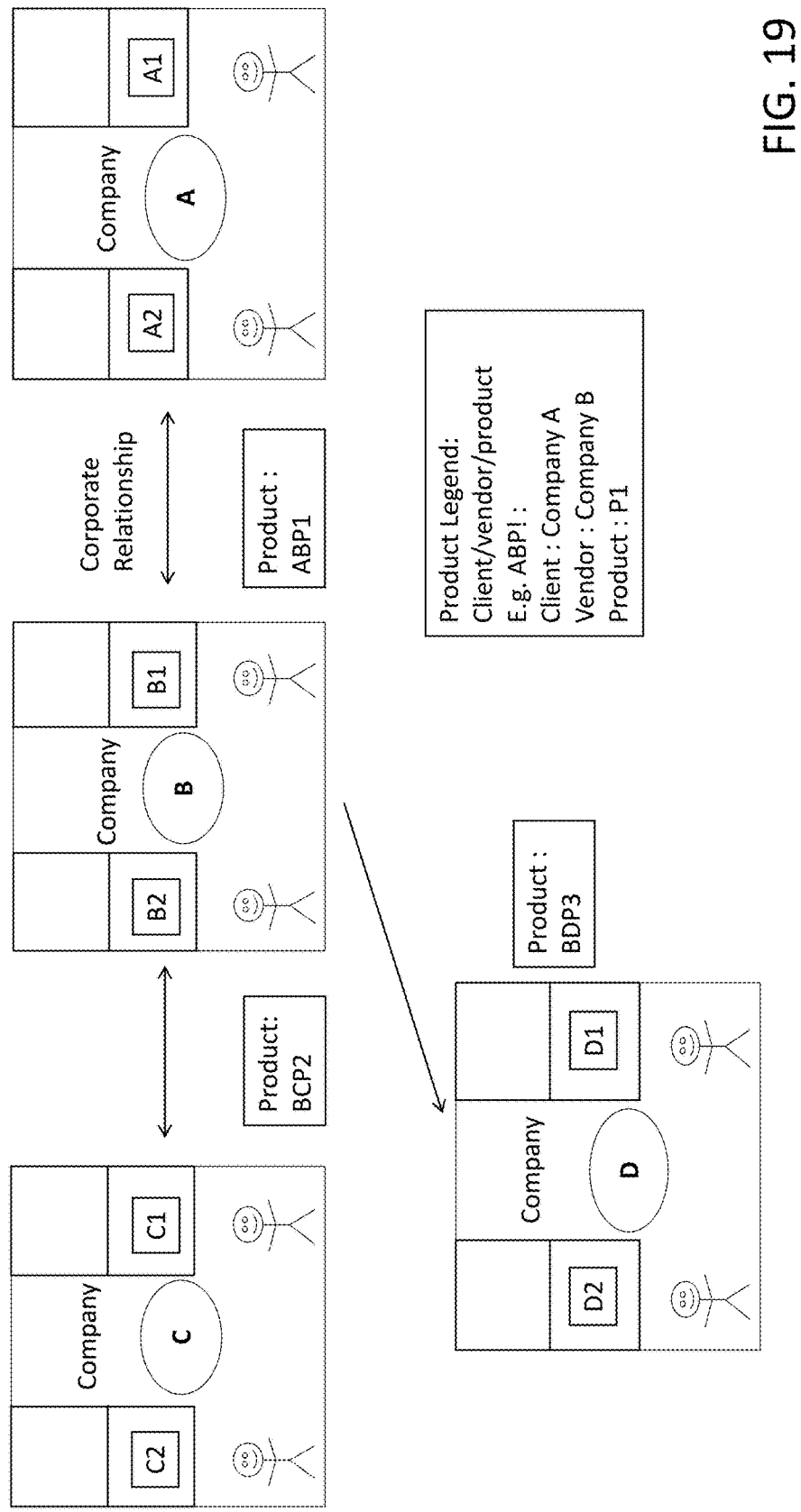
FIG. 19 is a modified representation of the MIEN system of FIG. 2, but showing the explicit data set that is mapped to effectuate a breach reporting and incident management (BRIM) system according to an embodiment.

FIG. 19 is similar to FIG. 2 but shows the explicit data set to be mapped for the BRIM system. Based upon this mapping, senders can allow subscribers to receive alerts on products and services in the case of an incident or breach. In an embodiment, the BRIM system is built on directory lookups (rather than being driven on invites as the MIEN system was described). The directory is shared amongst those willing to share incident and breach information. To further define the difference, in the MIEN system (without BRIM) a user can register for the system directly or could be invited by someone who is already subscribed to the system. Invitations and connections are made when both parties registered to complete an action. In the BRIM system companies register for the system, and once registration is complete they can then either list their services for someone to register to (sender), or they can subscribe to a service already listed (subscriber). In the MIEN system, connections are started at a user level and then propagate to the corporate level, while in the BRIM system all connections are kept at a company to product or service level. This figure helps show the differences between the MIEN system and the BRIM system, but also show that the basic relationship building block is the same.

Figure 20:
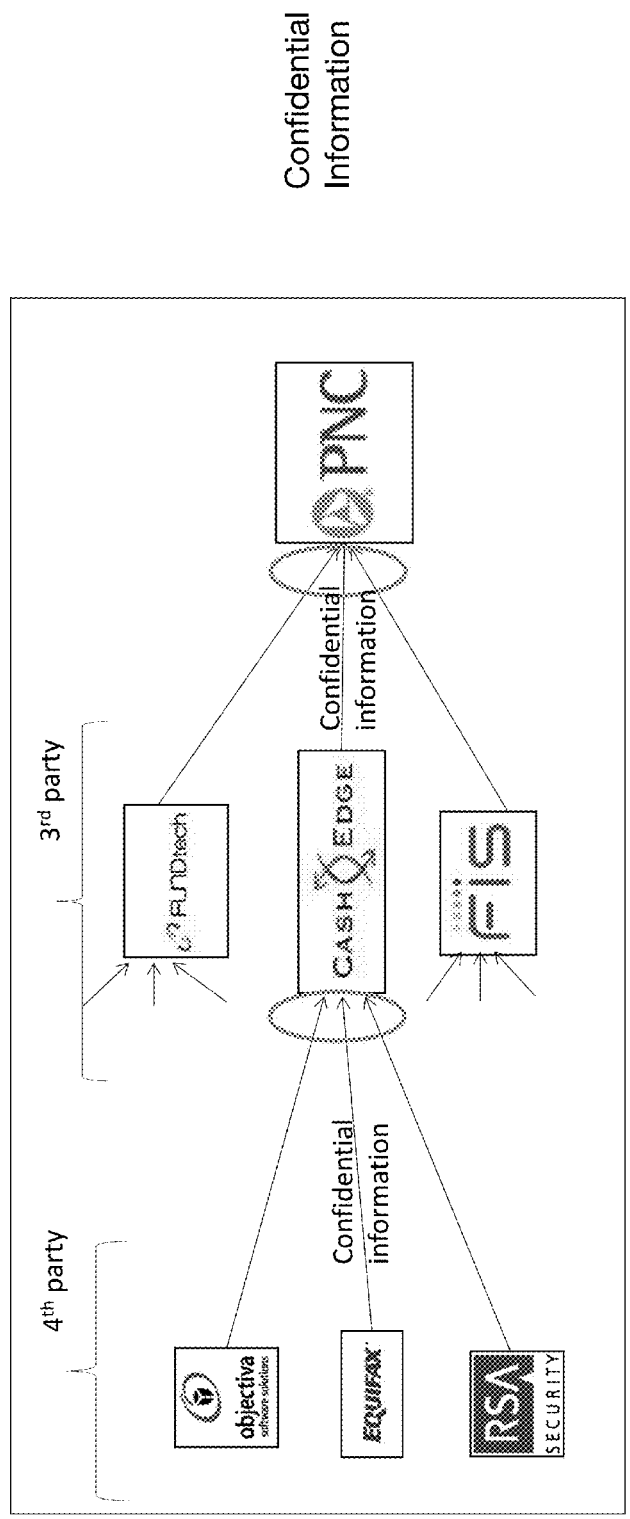
FIG. 20 is a modified representation of the MIEN system/network of FIG. 4, but illustrating the sharing of confidential information on the shared monitoring hub.

FIG. 20 is similar to FIG. 4, but is used here to illustrate the BRIM system. In the MIEN system any kind of data for monitoring or information can be exchanged, specifically in FIG. 4 talking to SLA and questionnaire data. BRIM is built upon the fact that this data is specifically confidential data, whether customer (PII), company confidential data (CCD) or any other type of secured data. The basis of the system is that alerts are sent surrounding the services offered that house some of this type of data. This helps companies understand where their data lies and also any type of incident or breach that may occur to it.

Figure 21:
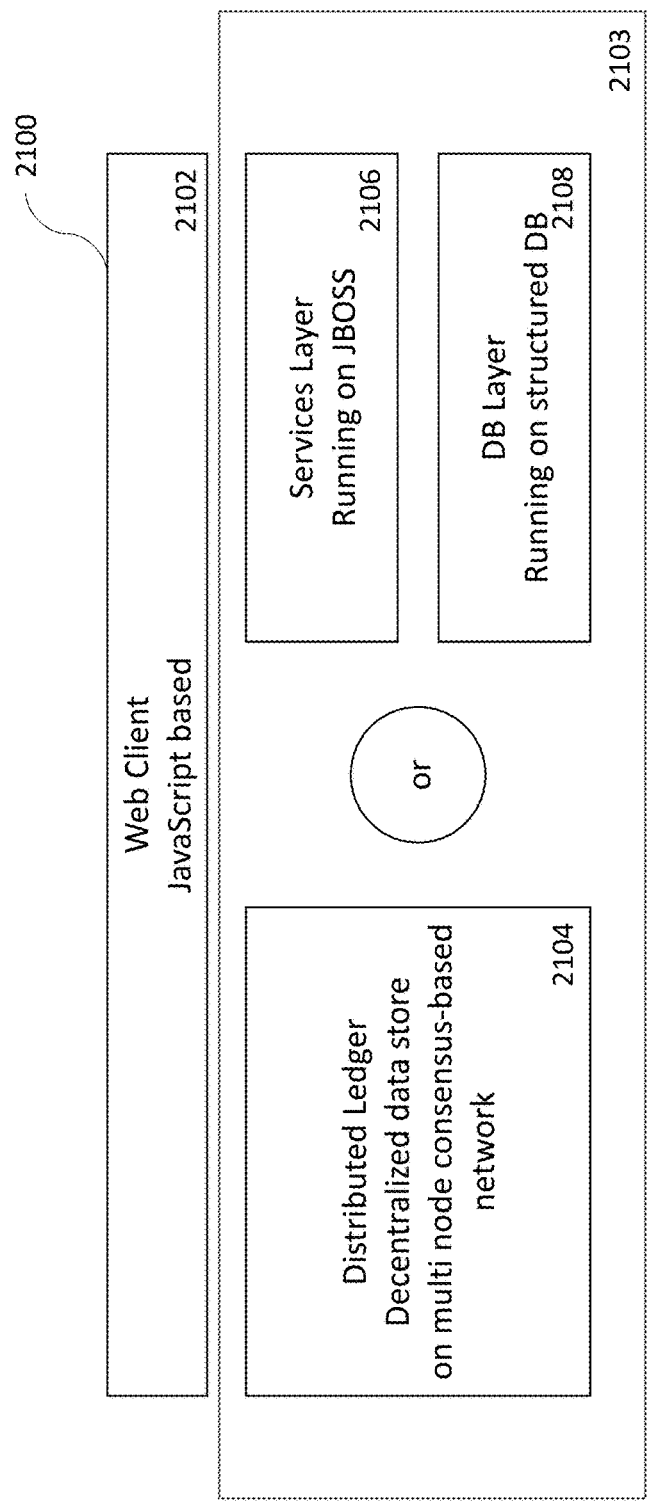
FIG. 21 is a diagram of a system architecture according to an embodiment.

FIG. 21 is a diagram of a BRIM system architecture 2100 according to an embodiment. It includes a single user interface (UI) layer 2102 that then transitions into one of two styles of data stores. The example UI layer shown is a JavaScript-based web client, but embodiments are not so limited. The data store 2103 for the BRIM system can be built upon a distributed ledger technology 2104. Distributed ledgers systems, also known as blockchain technology, fit the requirements extremely well. A distributed ledger is a type of database that is shared, replicated, and synchronized among the members of a network. Participants in the network govern and agree by consensus on the updates to the records in the ledger. No central, third-party mediator is involved. Every record in the distributed ledger has a timestamp and unique cryptographic signature, thus making the ledger an auditable history of all transactions in the network. This style of system is a consensus-based protocol, meaning the entire network has a standard way of posting and interpreting data which drives standards for usage. Each member in the network stores a validated copy of the entire chain, thus data is readily accessible and highly available. When a new member is introduced to the network they are vetted and given appropriate steps to post and request data from the network using individual keys to provide non-repudiation. All data in the chain is also encrypted so only authorized parties can receive and understand the information, and the hashing of the blocks provides immutability of the data but combined with the keys gives the ability to "forget" information over some period of time.

The data store can also be built on a services layer 2106 and structured DB 2108. The JBOSS services layer is just one example of a suitable services layer. The data in the DB is encrypted and the services are permissioned in order to provide the appropriate access to all parties in the system. Each company is vetted before receiving access to the services and each uses their own keys in order to communicate with the services layer 2106. This provides security for the data being stored at a customer level.

Figure 22:
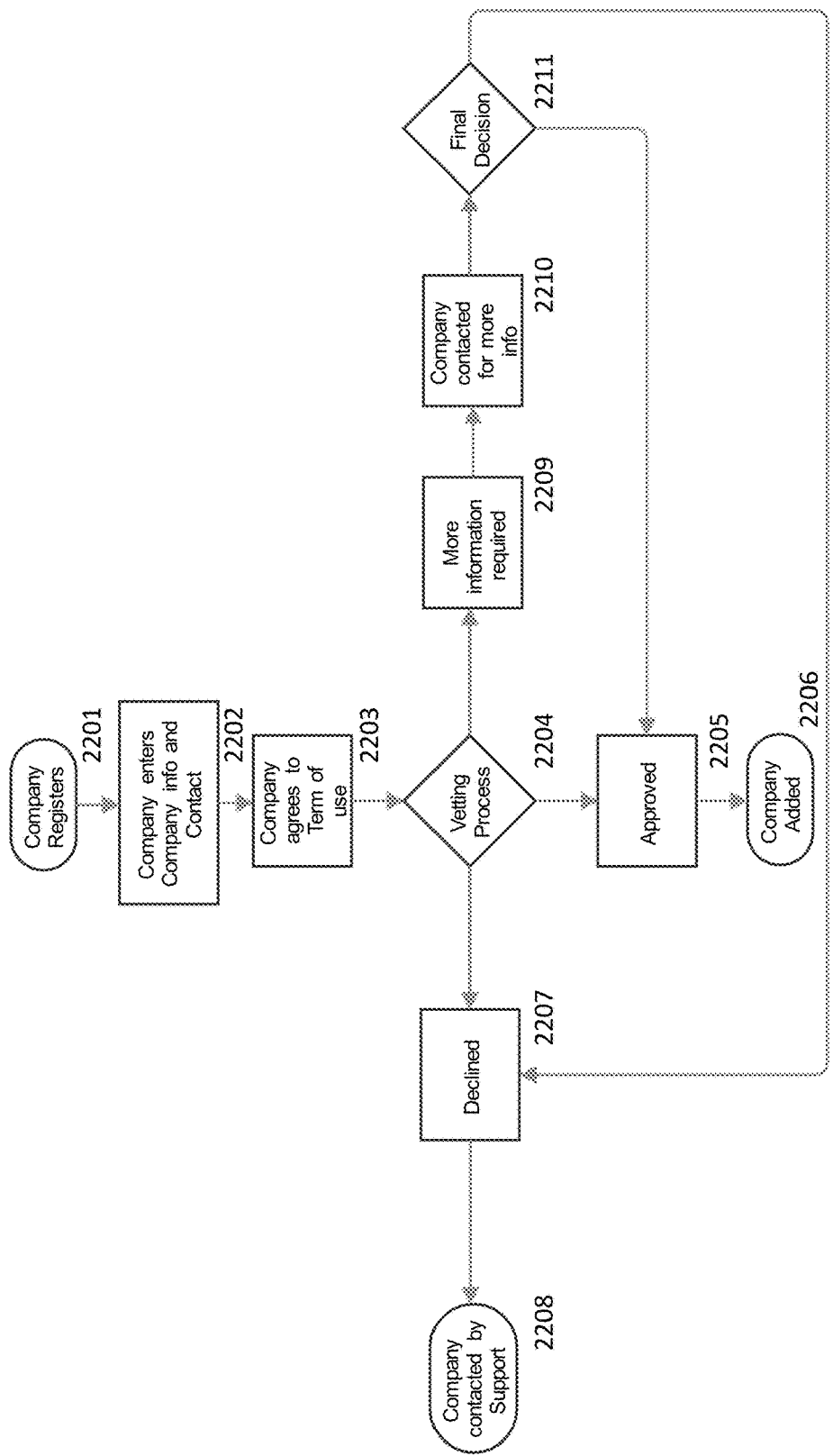
FIG. 22 is a flow diagram illustrating a method for registration with the BRIM system, according to an embodiment.

FIG. 22 is a flow diagram illustrating registration for the BRIM system according to an embodiment. At 2201, a company can come to the BRIM system and register to become part of the system. In order to do this, they need a contact who can speak on behalf of the company, who has a valid email address, and a valid domain owned by the company (2202). The user enters information in an online registration form. Once submitted, data is sent to a queue in order for the company to be vetted before being added to the network. The data will only be submitted once the BRIM Terms of Use are agreed to (2203).

In order to vet the company (2204), the email address is verified, the domain is verified and the services the company offers are verified. This can be done through email, searches on the internet, and third-party data sources as needed. The goal of the vetting process is to prove that the company is who they say they are, in order to ensure that the data is valid in the BRIM system. One of three decisions can come out of the vetting process 2204: the company is approved (2205), the company is declined (2207), or the company needs to provide more information (2209). If the company is approved it is sent a communication informing that they now have access to the BRIM system (2206). The company can then use the UI in order to interact with the other companies in the system.

If the company is declined (2207), a notification is sent to the contact that they will not be receiving access to the system and the reason (2208). In some situations, the data collected during the registration process is not enough to properly make a decision regarding whether the company is legitimate. This may mean that more information is required in order to make the decision (2209). More information may be requested of the company contact (2210). If this information is received in a reasonable time and in a reasonable manner a final decision can be made (2211). This decision will either (2205) approve the company, or (2207) decline the company access to the BRIM System.

Figure 23:
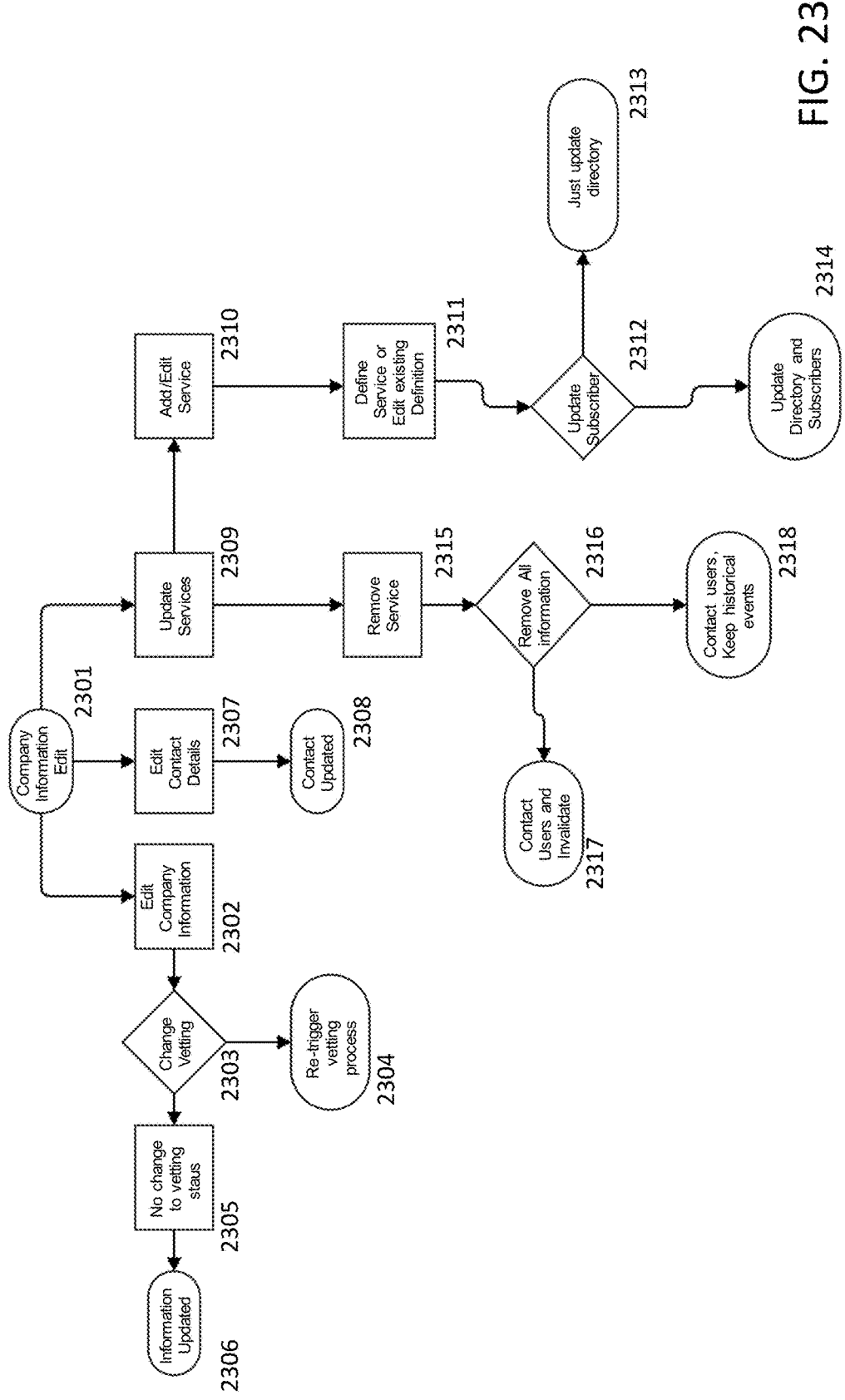
FIG. 23 is flow diagram illustrating a method for a company to setup its information, according to an embodiment.

FIG. 23 is a diagram illustrating a flow of company information according to an embodiment. Once a company has registered for the system (2301), it can setup information about the company (2302), its contacts (2307), and information on the products/services they provide (2309). This information is then fed back into the BRIM system to be consumed by other companies as needed. When editing company (2302) details there may be changes that would require the company to be re-vetted or re-examined to make sure it still viable as a company in the network (2303). This may be triggered by a name change or a change in ownership or any material change that would affect the makeup of the company as it maps to the products and services that the company offers and is listing in the BRIM system. If the vetting is triggered (2304) on an update, the company goes through the process in FIG. 22 (2204). If there are no changes to material information on the company (2305), then the information is immediately updated and published to the system (2306).

A company may have one or many contacts associated with the company. Contact information can be edited and updated (2307). Examples of contact information include a name, an email address, and a phone number that can be used for contacting and escalation of events in the BRIM system. The contact information is not shared outside the company but strictly used for notification purposes. This information should be up to date in order for the notifications on breach and incidents to flow correctly. Verification of this information is also requested when it is updated, meaning an email or text message (or similar) is initiated to the user, and the user is required to verify ownership. Once verification is complete data is updated in the BRIM system (2308).

A company (sender) has from one to many products and services that it offers to other companies (subscribers). Products and services can also be updated (2309). Each of these products and services is registered in the network so that other subscribers can receive notifications when there is a breach or incident on that product or service. The sender can change description information for these products and services. Users can add or edit a service (2310), or remove a service (2315). When adding a service, the sender adds service or product name, and a short description of what the service does. This information is used for the directory lookup. When editing the service (2311), the sender may want to alert subscribers of any changes in the description or name of the service (2312). The sender may choose not to send an update, in which case the directory will just be updated (2313). If the sender does choose to update, all subscribers to the service receive a notification of the change (2314). The sender can also remove any existing services (2315). During this process the sender needs to decide whether to allow access to historical information (2317), or whether the historical information is removed (2318). Whether the historical information is kept or not, subscribers are notified that a service is being removed and the service will be removed from the directory.

Figure 24:
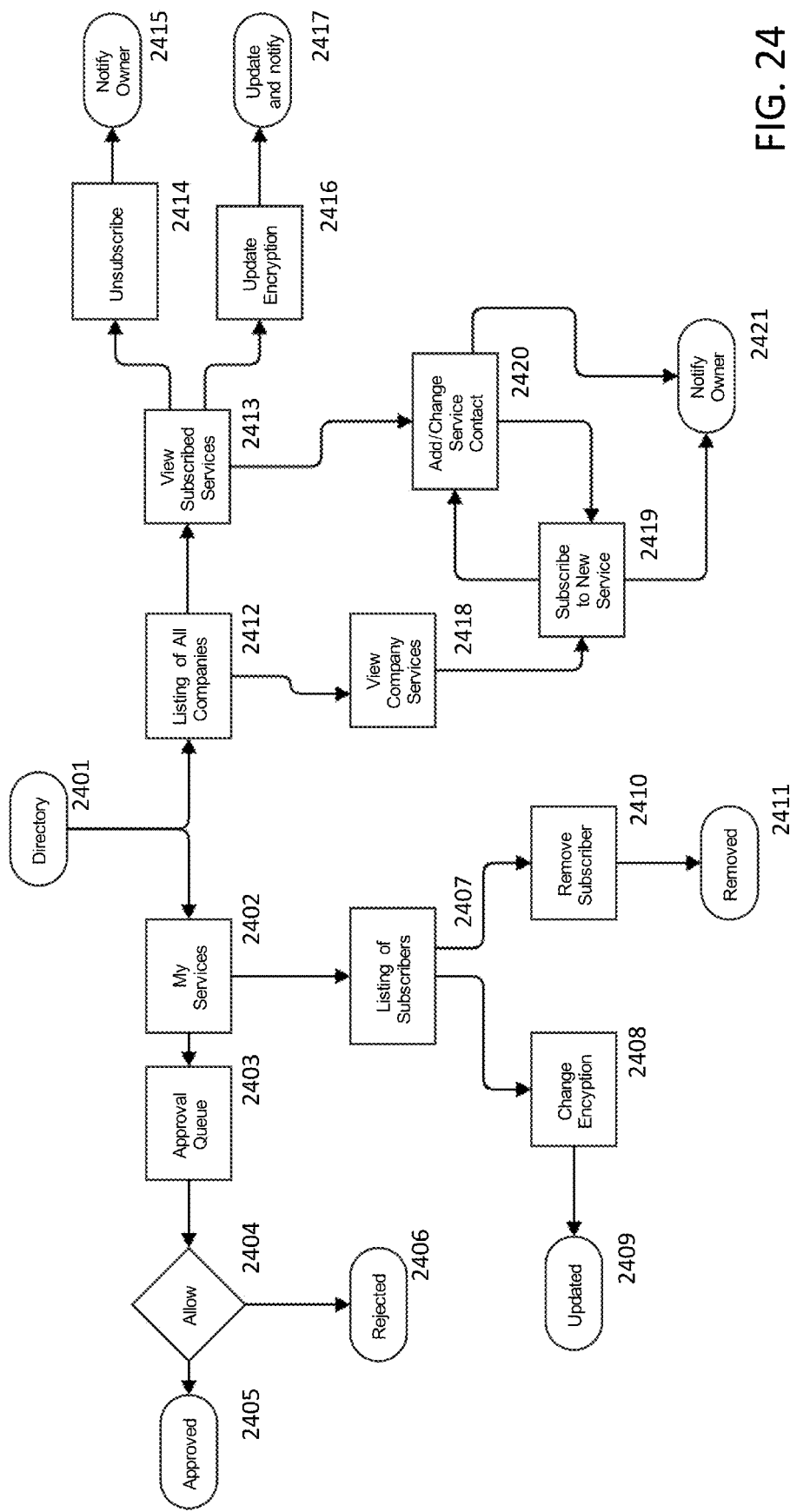
FIG. 24 is a flow diagram illustrating a directory method for subscribers to send and receive information.

FIG. 24 is a diagram illustrating actions and content in a BRIM Directory 2401, according to an embodiment. The BRIM directory 2401 holds the list of senders and their services to which other companies can subscribe. As used herein, a sender is an entity that posts, publishes, or uploads data to the BRIM system, and a subscriber is an entity that is approved by the sender to monitor and access this data.

This is a way in which a connection is made between the companies when a company subscribes to a service to receive notifications and the sender approves the registration. This directory is easily searchable, to find company and service names. My services 2402 is a list of services offered by a sender. This is the same list that was defined in the company information 2309. In the directory 2401, a sender edits the permissions that other companies have to receive their notifications. Each service has an approval queue 2403, and a list of current subscribers 2407. The approval queue 2403 is a list of subscribers that would like to get notifications for a product/service. At 2404, the sender can allow a user who has requested subscriptions to be approved (2405), or they can reject the subscriber with a message that will be sent (2406). When reviewing a listing of all the subscribers (2407), the sender can remove existing subscribers (2410) and decide whether to allow access to historical information or not. Senders can also update the encryption they are using (2408) in order to send the notifications. This will update the keys that are used to give permissions to view new notifications and also allow access to historical information.

The directory also shows a listing of all senders that are subscribed to the BRIM system (2412). This list includes company names and descriptions, and a listing of all services/products that the sender provides (2418). A company can ask to subscribe to notifications on one or many services (2420). A contact that is to receive the notifications is specified at this time (2419). This contact can be a single contact or a contact as part of an escalation, meaning notifications will be sent to contact first and if not acknowledged will be escalated to next person in the chain until the notification is acknowledged. After the subscriber adds the contact a notification is sent to the sender to let them know there is new subscriber on their approval queue. A subscriber can also see all of the services they have already subscribed to and edit any information on those services (2413). A subscriber has the ability to change the contacts (2419) who receive notifications. They also have the ability to unsubscribe (2414) from the service, and they can also update their encryptions keys (2416). Updating encryption allows subscribers to change their signatures yet still retain access to any new notification as well as any historical notifications.

Figure 25:
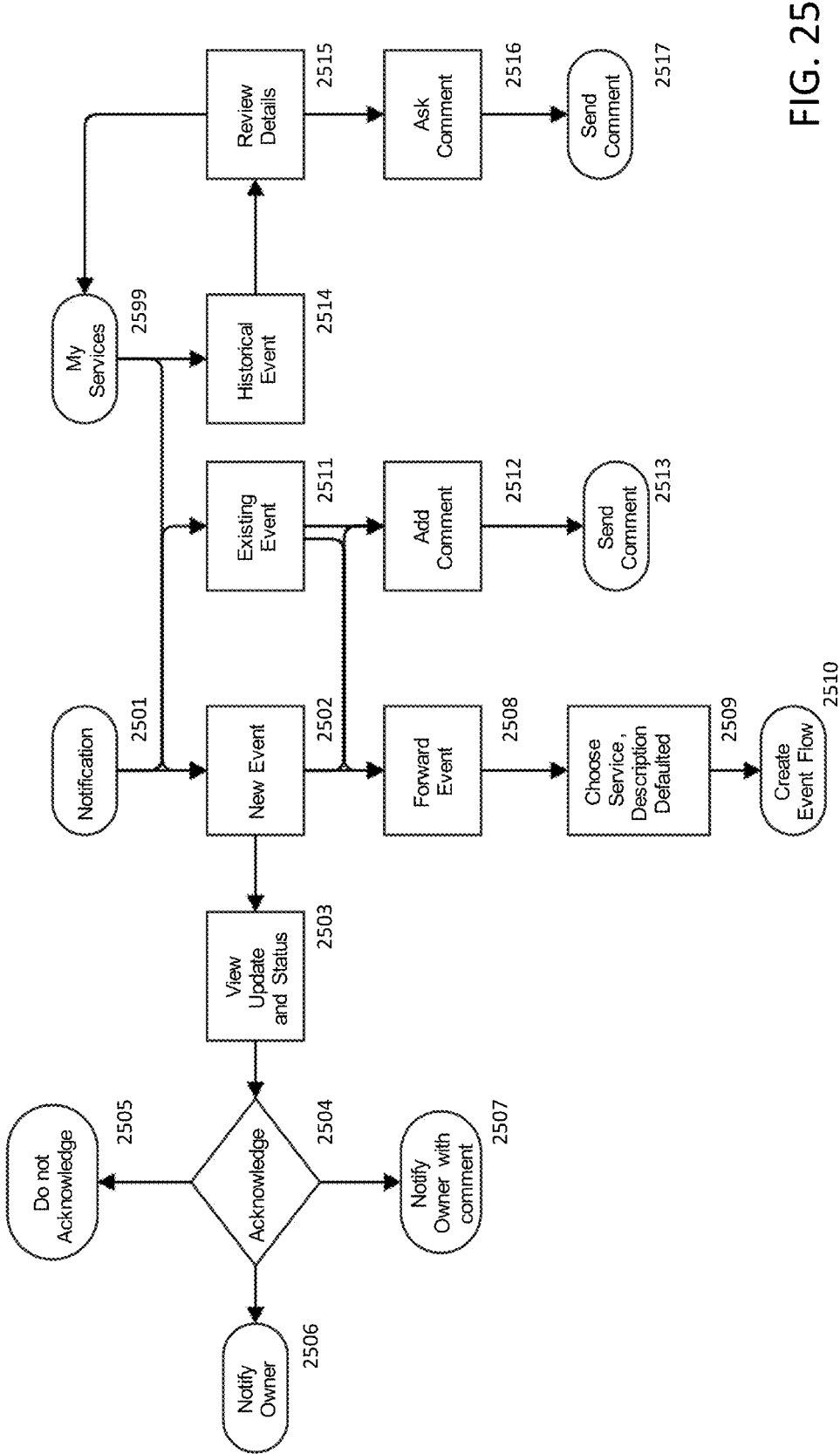
FIG. 25 is a flow diagram illustrating an email notification and review method according to an embodiment.

FIG. 25 is a diagram illustrating email notification and review. One of the features of the BRIM system is the notifications subscribers receive regarding breaches or incidents on the products/services that they use. These notifications alert subscribers to the fact that something is happening and also give a historical aspect as to how the service is managed, and its track record. This email and notification module also provides the ability for the two sides to collaborate around any of the events that take place.

Notification 2501 is made up of three separate functions: inbox of new events (2502); updates to existing events (2511); and a view of historical events (2514). These functions can be accessed from notifications as well as from My Services (2599).

The new events 2502 that send notifications need to be acknowledged when received. This lets the sender know that the notification has been read, and that it is understood that there is an event going on. Without this acknowledgement the sender must escalate by another channel in order to make sure the subscriber is aware of the event. When the notification is read the subscriber can (2506) notify the sender straight away (2507) notify the sender and comment on the event, or (2505) not acknowledge the event. If a comment is added the sender is notified that the event is acknowledged and there is comment waiting for response. When an event is also not acknowledged, if this is part of an escalation, the next person in the escalation path is notified of the event and asked to respond. If the contact is not a part of an escalation path, then they are notified again that the event is waiting to be acknowledged. A new event can also be forwarded (2508) based on a service. Example: If company A is using service B as a part of their service A, then company A may forward any events on service B to their subscribers as their service A is impacted by events on service B. Also company C may offer service C based on service A and when an event on service A is sent may choose to forward to their subscribers and so on. So an initial event may be forwarded down the chain of services that rely on the initial service, in this example service B. Referring to 2509, when the event is forwarded it is sent as a new event with description level details pre-filled but still needs information on which service to map to, it is then sent as a new event (see element 2606 of FIG. 26). Also at any time a comment can be created on a notification (2512). This allows collaboration between parties at a company level, for example to ask clarifying questions, or to gather more data as required. This communication is kept private between the two companies.

Existing events 2511 are seen in a separate queue from new events. Updates to existing events 2511 will not require acknowledgement, as the sender will already have a record that initial event notification was received. Just as the new event can be forwarded (2508), existing event notifications can also be forwarded and marked against a service. This process is similar to new event forwarding but will only add to an event and not create a new event each time. The subscriber can also send comments to the sender on any notification received on an existing event (2512) in order to ask clarifying questions or get more information. Once an existing event is closed it is moved to historical events.

Historical events 2514 on services can be reviewed. The entire history or audit trail of the event along with any existing comments between companies can be viewed (2515). New comments can be created on the events and sent to the sender also. Analyses of these events and trends related to the events can be seen as well. This helps a subscriber create a risk score based upon events and the severity as well as response time and finalization of the events.

Figure 26:
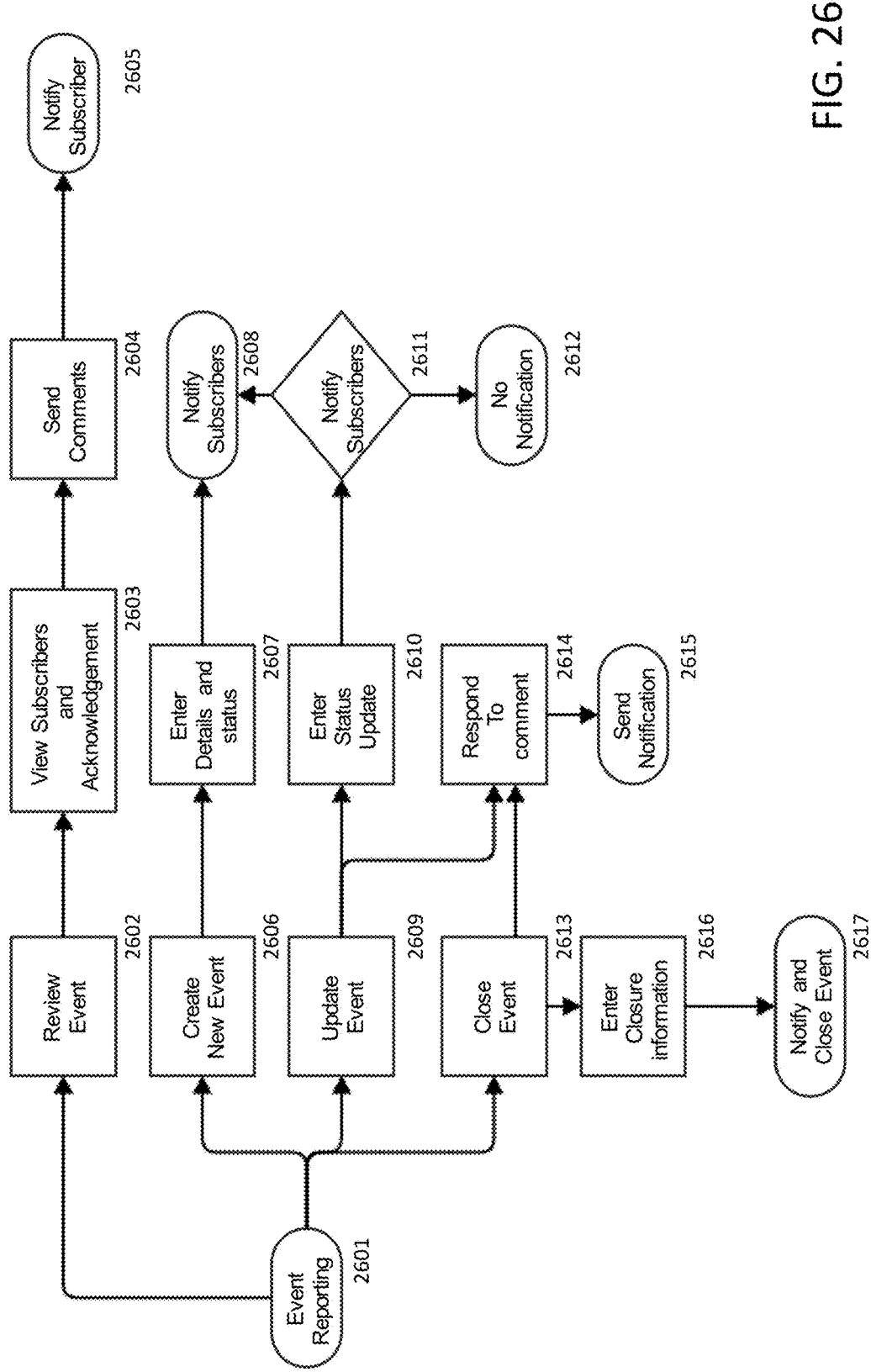
FIG. 26 is an event reporting method according to an embodiment.

FIG. 26 is a diagram illustrating aspects of event reporting 2601, according to an embodiment. Information is distributed based on an event taking place as shown in this figure. These events are breaches or incidents that a sender wants to make sure their clients and partners are made aware of. Event details include what is going on and when an event starts and stops. A root cause analysis (RCA) or event description and resolution may be attached to the close of the event as well.

In order to create a new event 2606, the sender must choose the service that the event is related too. This service was setup in the company information and may have one to many subscribers listening for an event to take place. Once the service is chosen, details of the event taking place, type of event taking place and status of what is happening is required (2607). This information creates the initial notification of the event being created (2608). The notification will be sent to all active subscribers listening to events on the service. For the first event, each subscriber that is listening is required to acknowledge that they have viewed the event notification. This acknowledgement is stored on the event, so the sender will have an audit history of the subscribers that have acknowledged the notification. In some situations there will only be a single notification for an event, and the event can be closed immediately, but in most situations there will be multiple updates (2609) to an event with status changes and timelines, as the sender restores the service or better understands the impact of the breach. These updates have required fields that are similar to "create event", but unlike "create event" the sender can choose to send or not send a notification and the subscriber will not be required to acknowledge the updates. All updates are available on the event history to both sender and subscriber but not all updates have a notification sent. After an event is created the sender can also respond (2614) to any comments that have come from subscribers. This communication is private between the two companies. This can be used as an avenue of collaboration for specific information to be sent and received. The sender can also initiate comments to another subscriber, which is again a private communication between the two. The closure of an event (2613) differs from another update as it signals that this is the last notification for the event. In its message it may have closure information (2616) or an RCA in order to close out the event. A subscriber can comment on the closure of an event as well.

Any past events can also be reviewed (2602). There is a history or audit trail of all the notifications sent, all the acknowledgments from the subscribers, and the comments associated with them. A list of all the updates, and the closure information are also available. Any comments created by subscribers after the event was closed can also be viewed from this page.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. For example, while only one aspect of the systems and methods may be recited as embodied in machine-readable medium, other aspects may likewise be embodied in machine-readable medium. Accordingly, the inventors reserve the right to add additional claims after filing the application to pursue such additional claim forms for other aspects of the systems and methods.

The invention claimed is:

1. A breach reporting and incident management (BRIM) directory-based system, comprising:
    at least one searchable database system;
    at least one processor coupled to the at least one searchable database system, the at least one processor executing instructions for a BRIM system method, the method comprising,
        executing a plurality of user interface processes for enabling users to interact with the system;
        executing a plurality of application programs interfaces (APIs) enabling multiple systems external to the system to interact with the system, including exchanging data and querying the at least one searchable database;

initiating connections between users of the system, wherein users of the system comprise individuals acting on behalf of corporate entities; and automatically managing relationships between users of the system, including storing communication history, automatically generating and exchanging data and data queries that are repeatedly required, and causing changes in databases and processor configurations of the at least one searchable database, the at least one processor, and databases and processors external to the system; wherein users comprise senders that post, publishes, and upload data to the BRIM system, and subscribers that is an entity are approved by senders to monitor and access this data, and wherein the data includes data regarding security breaches affecting any sender services.

2. The system of claim 1, further comprising:
a vendor management module for storing vendor data and executing vendor related tasks; and
a client management module to storing client data and executing client related tasks.

3. The system of claim 1, further comprising a compliance update module for automatically tracking and implementing updates to compliance requirements.

4. The system of claim 1, further comprising:
at least one caching server; and
an unstructured database layer and a structured database layer coupled between the at least one caching server and an internet proxy server.

5. The system of claim 1, further comprising:
at least one caching server; and
a web services layer and a web layer coupled between the at least one caching server and an internet proxy server.

6. The system of claim 1, wherein automatically managing relationships between users of the system comprises managing multiple layers of relationships between vendors and clients, and wherein a vendor in one context may be a client in another context.

7. The system of claim 1, wherein the method further comprises a monitoring function comprising risk assessment, performance monitoring, and document collection, storage and exchange.

8. The system of claim 1, further comprising a shared monitoring hub through which vendors and clients are kept current on tasks, including performance monitoring, risk assessment, document archival, document exchange, and analytics.

9. The system of claim 1, wherein the method further comprises automatically deducing relationships between system users based on connections between users.

10. The system of claim 9, wherein the method further comprises organizing user connections and company connection separately by tagging data that is exchanged between users.

11. A computer-implemented method for a monitoring and information exchange network (MIEN), the method comprising:
at least one processor executing instructions to communicate between a MIEN system and various users of the system, wherein the various users include users of other systems whose processors and databases are automatically altered by the execution of the instructions, the instructions causing the performance of the method comprising, executing a plurality of user interface processes for enabling users to interact with the system;
executing a plurality of application programs interfaces (APIs) enabling multiple systems external to the system to interact with the system, including exchanging data and querying the at least one searchable database;
initiating connections between users of the system, wherein users of the system comprise individuals acting on behalf of corporate entities; and
executing at least one module comprising a vendor module and a client module;
automatically managing relationships between users of the system, including storing communication history, automatically generating and exchanging data and data queries that are repeatedly required, and causing changes in databases and processor configurations of the at least one searchable database, the at least one processor, and databases and processors external to the system; and wherein automatically managing relationships further includes managing a history of individuals at the different corporate entities, maintaining a history of the relationships and a history of data inquiries.

12. The method of claim 11, further comprising validating the authenticity of users and validating the authenticity of corporate.

13. The method of claim 11, further comprising executing a request-for-content process, comprising:
determining whether the request is directed to a user who is connected to the system; and
if the user is connected to the system, sending the request to the user.

14. The method of claim 13, further comprising, if the user is not connected to the system, sending an invitation to the user and allowing the user to register with the system as a guest.

15. The method of claim 13, further comprising:
if the user is not connected to the system, sending an invitation to the user and allowing the user to register as a guest; and
if the user registers as a guest, creating a connection for the user to the system.

16. The method of claim 11, further comprising executing a content publication process, the process comprising:
determining whether a recipient for the content is connected to the system;
if the recipient is not connected to the system, determining whether the recipient exists in the system;
if the recipient exists in the system, sending the recipient an email requesting to view the content; and
if the recipient does not exist in the system, sending an invitation to the recipient to receive the content.

17. The method of claim 16, further comprising, if the recipient is connected to the system, determining whether the content is private, and setting access rules accordingly.

18. The method of claim 17, wherein access rules include expiration date, identification of watermarks, and authorized ability to download.

19. A non-transient computer readable medium having stored thereon instructions that when executed on a processor cause the performance of a monitoring and information exchange network method, the method comprising:
a plurality of user interface processes for enabling users to interact with the system;
a plurality of application programs interfaces (APIs) enabling multiple systems external to the system to interact with the system, including exchanging data and querying the at least one searchable database;

initiating connections between users of the system, wherein users of the system comprise individuals acting on behalf of corporate entities; and automatically managing relationships between users of the system, including storing communication history, automatically generating and exchanging data and data queries that are repeatedly required, and causing changes in databases and processor configurations of the at least one searchable database, the at least one processor, and databases and processors external to the system; and wherein automatically managing relationships further includes managing a history of individuals at the different corporate entities, maintaining a history of the relationships and a history of data inquiries, wherein the history of individuals comprises names of individuals, contact information of individuals, and a record of communications between pairs of individuals that interact one behalf of different corporate entities.

20. The non-transient computer readable medium of claim 19, wherein the method further comprises automatically tracking and implementing updates to compliance requirements.

21. The non-transient computer readable medium of claim 19, wherein the method further comprises a monitoring function comprising risk assessment, performance monitoring, and document collection, storage and exchange.

* * * * *